United States Patent
Hatami-Hanza

(10) Patent No.: US 9,842,129 B2
(45) Date of Patent: Dec. 12, 2017

(54) ASSOCIATION STRENGTHS AND VALUE SIGNIFICANCES OF ONTOLOGICAL SUBJECTS OF NETWORKS AND COMPOSITIONS

(71) Applicant: Hamid Hatami-Hanza, Thornhill (CA)

(72) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 543 days.

(21) Appl. No.: 14/607,588

(22) Filed: Jan. 28, 2015

(65) Prior Publication Data
US 2015/0142820 A1 May 21, 2015

Related U.S. Application Data

(60) Division of application No. 13/740,228, filed on Jan. 13, 2013, now Pat. No. 9,183,505, which is a continuation of application No. 12/179,363, filed on Jul. 24, 2008, now abandoned, which is a continuation of application No. 12/547,897, filed on Aug. 26, 2009, now abandoned.

(51) Int. Cl.
| | |
|---|---|
| *G06F 17/00* | (2006.01) |
| *G06F 17/30* | (2006.01) |
| *G06N 5/04* | (2006.01) |
| *H04L 29/08* | (2006.01) |
| *G06N 5/02* | (2006.01) |

(52) U.S. Cl.
CPC .. *G06F 17/30321* (2013.01); *G06F 17/30584* (2013.01); *G06F 17/30734* (2013.01); *G06N 5/02* (2013.01); *G06N 5/048* (2013.01); *H04L 29/08072* (2013.01); *H04L 67/10* (2013.01); *H04L 69/329* (2013.01)

(58) Field of Classification Search
CPC .......................... G06N 5/02; G06F 17/30734
USPC ..................................... 706/12, 45
See application file for complete search history.

(56) References Cited

U.S. PATENT DOCUMENTS

| | | | | |
|---|---|---|---|---|
| 2009/0024615 | A1* | 1/2009 | Pedro | G06F 19/324 |
| 2009/0030897 | A1* | 1/2009 | Hatami-Hanza | G06Q 10/10 |
| 2011/0040766 | A1* | 2/2011 | Robinson | G06F 17/3053 707/749 |

* cited by examiner

Primary Examiner — David Vincent

(57) ABSTRACT

The present invention discloses methods, systems, and tools for evaluating a number of value significance measures of ontological subjects of compositions or networks. The method breaks a composition into its constituent ontological subjects of different orders and builds a participation matrix indicating the participation of ontological subjects of the composition in other ontological subjects, i.e. the partitions, of the composition. Using the participation information of the OSs into each other, an association strength matrix is built from which the value significance measures of the partitions of the composition are calculated. The methods systematically calculate the value significances of the ontological subjects of different orders of the composition. Various systems for implementing the methods and some exemplary applications and services are disclosed.

8 Claims, 13 Drawing Sheets

$iop_i^{k|l}$: The Independent Occurance Probability of $OS_i^k$ in $OS^l$ $com_{ij}^{k|l}$: The Co-Occurance of $OS_i^k$ with $OS_j^k$ $asm_{ij}^{k|l}$: The association Strength of $OS_i^k$ with $OS_j^k$

ASSOCIATION STRENGTHS AND VALUE SIGNIFICANCES OF ONTOLOGICAL SUBJECTS OF NETWORKS AND COMPOSITIONS

CROSS-REFERENCED TO RELATED APPLICATIONS

The present application is a divisional of U.S. patent application Ser. No. 13/740,228, filed on Jan. 13, 2013, entitled "SYSTEM AND METHOD FOR VALUE SIGNIFICANCE EVALUATION OF ONTOLOGICAL SUBJECTS OF NETWORKS AND THE APPLICATION THEREOF" which is a divisional of and claims the benefits of the U.S. patent application Ser. No. 12/939,112, filed on Nov. 3, 2010, now U.S. Pat. No. 8,401,980, entitled "METHODS FOR DETERMINING CONTEXT OF COMPOSITIONS OF ONTOLOGICAL SUBJECTS AND THE APPLICATIONS THEREOF USING VALUE SIGNIFICANCE MEASURES (VSMS), CO-OCCURRENCES AND FREQUENCY OF OCCURRENCES OF THE ONTOLOGICAL SUBJECTS SYSTEM", which claims priority from U.S. provisional application No. 61/259,640 filed on Nov. 10, 2009, entitled "SYSTEM AND METHOD FOR VALUE SIGNIFICANCE EVALUATION OF ONTOLOGICAL SUBJECTS OF NETWORKS AND THE APPLICATION THEREOF"; and also cross-references and claims the benefits of:

the U.S. patent application Ser. No. 12/179,363 entitled "ASSISTED KNOWLEDGE DISCOVERY AND PUBLICATION SYSTEM AND METHOD", filed on Jul. 24, 2008, which claims priority from Canadian Patent Application Ser. No. CA2,595,541, filed on Jul. 26, 2007, entitled the same; and the U.S. patent application Ser. No. 12/547,879 filed on Aug. 26, 2009, now U.S. Pat. No. 8,452,725, entitled "SYSTEM AND METHOD OF ONTOLOGICAL SUBJECT MAPPING FOR KNOWLEDGE PROCESSING APPLICATIONS", which claims priority from the U.S. provisional patent application no. 61/093,952 filed on Sep. 3, 2008, entitled the same; and the U.S. patent application Ser. No. 12/755,415, now U.S. Pat. No. 8,612,445, filed on Apr. 7, 2010, entitled "SYSTEM AND METHOD FOR A UNIFIED SEMANTIC RANKING OF COMPOSTIONS OF ONTOLOGICAL SUBJECTS AND THE APPLICATIONS THEREOF", which claims priority from U.S. provisional patent application No. 61/177,696 filed on May 13, 2009 entitled the same; and the U.S. patent application Ser. No. 12/908,856 entitled "SYSTEM AND METHOD OF CONTENT GENERATION", filed on Oct. 20, 2010, which claims priority from U.S. provisional application No. 61/253,511 filed on Oct. 21, 2009, entitled the same, which are all of the U.S. priority applications are incorporated entirely as references in this application.

FIELD OF INVENTION

This invention generally relates to information processing, ontological subject processing, knowledge processing and discovery, knowledge retrieval, artificial intelligence, information theory, natural language processing and the applications.

BACKGROUND OF THE INVENTION

Most of human knowledge has been recorded and stored by textual compositions or can be converted to textual compositions. The information in written texts and compositions has been used in traditional way by individual researchers and professionals to draw useful conclusions about the desired task or goals or applications. However, in these day and age that data is generated at an unprecedented rate it is very hard for a human operator to analyze these large bodies of data in order to extract the real information and knowledge therein and using them to further advance the state of knowledge or discovery of a real knowledge about any subject matter.

For example for any topic or subject there are vast amount of textual repositories such as collection of research papers in any particular topic or subject, news feeds, interviews, talks, video collections and the like. Gaining any benefit from such unstructured collections of information needs lots of expertise, time, and many years of training just even to separate the facts and value out of these immense amounts of data. Not every piece of data is worthy of attention and investigation or investment of expensive times of experts and professionals.

Moreover, there is no guarantee that a human investigator or researcher can accurately analyze the vast collection of documents and information. The results of the investigations are usually biased by the individual's knowledge, experiences, and background. The complexities of relations in the bodies of data limit the throughputs of knowledge-based professionals and the speed at which credible knowledge can be produced. The desired speed or rate of knowledge discovery apparently is much higher than the present rate of knowledge discovery and production.

Therefore, there is a need to enhance the art of knowledge discovery in terms of accuracy, speed and throughput.

SUMMARY OF THE INVENTION

In order to increase the speed and accuracy of the process of such a research, knowledge discovery, and investigations, it is important to identify the role of each concept, entity, any force, and their relations in a desired system of knowledge. By the system of knowledge we mean a body of knowledge in any field, narrow or wide. For instance a system of knowledge can be defined about the process of stem cell differentiation. In this example there are many unknowns that are desired to be known. So consider someone has collected many or all textual compositions about this subject. Apparently the collections contains many useful information about the subject that are important but can easily be overlooked by a human due to the limitations of processing capability and memory capacity of individuals' brains.

Moreover any system, simple or complicated, can be identified and explained by its constituent parts and the relation between the parts. Additionally, any system or body of knowledge can also be represented by network/s or graph/s that shows the connection and relations of the individual parts of the system. The more accurate and detailed the identification of the parts and their relations the better the system is defined and designed and ultimately the better the corresponding tangible systems will function. Most of the information about any type of existing or new systems can be found in the body of many textual compositions. Nevertheless, these vast bodies of knowledge are unstructured, dispersed, and unclear for non expert in the field.

Therefore it is desirable to have method, systems, and apparatuses that can identify any system or body of knowledge by identifying the most valuable and significant, or conceived to be important at the time, parts in that system.

In other words, it is highly desirable to find out the "value significances" of parts and partitions of a system or body of knowledge.

Such a method will speed up the research process and knowledge discovery, and design cycles by guiding the users to know the substantiality of each part in the system. Consequently dealing with all parts of the system based on the value significance priority or any other predetermined criteria can become a systematic process and more yielding to automation.

Application of such methods and systems would be many and various. For example lets say after or before a conference, with many expert participants and many presented papers, one wants to compare the submitted contributing papers, draw some conclusions, and/or get the direction for future research or find the more important subjects to focus on, he or she could use the system, employing the disclosed methods, to find out the value significance of each concept along with their most important associations and interrelations. This is not an easy task for those who do not have many years of experience and a wide breadth of knowledge.

Or consider a market research analyst who is assigned to find out the real value of an enterprise by researching the various sources of information. Or rank an enterprise among its competitors by identifying the strength and weakness of the enterprise constituent parts or partitions.

Many other consecutive applications such as searching engines, summarization, distillation, etc. can be performed, enhanced, and benefit from having an estimation of the value significance of the partitions of the body of knowledge.

In the patent application Ser. No. 12/547,879 entitled "System and Method of Ontological Subject Mapping for knowledge Processing Applications" filed on Aug. 26, 2009 by the same applicant, a method and system was disclosed to transform the information of compositions into representative graphs called "Ontological Subject Maps (OSM)". The map is not only useful for graphical representation of the body of knowledge of the input but also can be used to evaluate the value significances of the OSs (OS stands for Ontological Subjects such as words used in the textual composition) in the graph as explained in the patent application Ser. No. 12/547,879. The value significance of the lower order OSs can be evaluated satisfactorily well pronounced and be used for desirable applications. However, the algorithm and the method demand a considerable processing power when the desired number of OSs becomes large.

Also in the patent application Ser. No. 12/755,415 filed on Apr. 7, 2010 by the same applicant, the concept of "Semantic Coverage Extent Number (SCEN)" was introduced as one of the significance measures of the parts and the partitions of a composition. The significance ranking method was based first by transforming the information of an input composition into numerical matrixes called "Participation Matrices (PMs)" from which, for example, the similarities of Ontological Subjects (OSs or partitions of the composition) can be estimated. It was shown that transforming the information of an input composition into participation matrices is very instrumental in evaluating the semantic importance or value significance of the partitions of the composition. The method makes the calculation straightforward and very effective while making the usage of memories and processing power much more efficient.

However proposing other fundamental measures of significances, or more process efficient, or other measures of significances with high contrast or higher semantic clarity can be helpful. The different measures can be used in different circumstance and complexities depend on the demanded quality of semantic clarity and relevancy of results, processing power, storage medium, and the applications.

In this disclosure various "Value Significance Measures (VSMs)" are introduced which are regarded as the intrinsic and signs of significance of an ontological subject within the composition that the OS has been appeared. These significance measures further is interpreted as the semantic importance, economical value, market value or market price, influence and importance of a feature or functional significance in a complex systems including man-made or biological systems, all types of multimedia compositions and their representation be it electrical signal representation or otherwise. In particular, the VSMs introduced here take into account the information of participation patterns of OSs of the composition into each other or with each other in a network of ontological subjects such as connected group of people, networks or graph of related concepts, semantics, or physical systems and so on.

The method transforms the information of compositions of ontological subject into matrices and the graphs or networks corresponding to the proposed matrices. Since the OS can refer to any and all the things in the universe, the resultant graph can be applied for and to any graphs of entities such as social networks, a network of players and products and concepts in a particular industry, genomics, compositions of genetic codes, or any particular area of knowledge and science etc. In similar manner any composition of Ontological subjects can be viewed as a social network or vice versa which is important to evaluate the value of each member or any sub-group member of the network in order to analysis and process other features of interest such as influence, economical value, likelihood of new discovery, knowledge discovery, new composition generation, summarization, distillation, search engines, keyword identification, and the like.

We use texts as our available and vast sources of information that are available on the internet or corporate databases. Using the textual contents we then can build various "participation matrices" and many graphs for all type of ontological subjects and orders and start processing the information in an effective way utilizing the ever increasing processing power and decreasing cost of storage of modern computers and computer systems and networks.

Using the concepts and definitions introduced in the in the patent application Ser. No. 12/755,415 filed on Apr. 7, 2010, entitled "System And Method For A Unified Semantic Ranking Of Compositions Of Ontological Subjects And The Applications Thereof" which is incorporated herein as reference and cited before; one can consider the textual compositions as compositions of Ontological Subjects. As it will follow in the definition section in this disclosure the Ontological Subjects, OSs for short, are strings of character that refer to any entity, object or concept, of interest. Therefore in this disclosure the proposed problem of assigning value to any knowable entity of interest in a system of knowledge reduces to assigning a quantitative value to OSs of a composition or collection of compositions that form a system of knowledge.

Furthermore according to the definitions, sets of ontological subjects (OSs) are ordered based on their length and function. For instance, for ontological subjects of textual nature, one may characterizes letters and characters as zeroth order OS, words as the first order, sentences as the second order, paragraphs as the third order, pages or chapters as the forth order, documents as the fifth order, corpuses as the sixth order OS and so on. Equally and in a similar manner one can order the genetic codes in different orders of ontological subjects.

Although for the sake of clarification and ease of explanation we focus on the ontological subjects of textual nature and mostly for natural language texts for their importance, one can easily extend the teachings of the method and the associated system to other forms of ontological subject of different nature for the corresponding applications. For instance, in genomics applications the method can be readily and effectively used for fast DNA analysis, ranking and determining the valuable or interesting partitions of the genome, discovering dominant genes, sketching gene spectrum, as well as other genetic engineering applications such as fast genomic summarization, fast genomics identification and fast genetic engineering and the like. Moreover, for other equally important applications the method and system can be extended and used. For example, in signal processing applications the method and the associated system/s may be employed for variety of applications such as voice and video recognition, voice and video/image comparison, feature extraction, picture/image recognition such as face or scene recognition and the like.

Accordingly, we regard any textual composition as a network of OSs that have connections to other OSs that can also be represented by a graph and the corresponded adjacency matrices for numerical processing of the resulting graphs or the networks of the OSs of the composition.

In this disclosure the evaluation of the "Value Significance Measures (VSM)" of OSs of different length, i.e. order, is done by breaking a high order OS, e. g. a text composition, into its lower order constituent OSs. Thereafter, constructing at least one Participation Matrix (PM), by indicating the participation of a number of OSs, having lower order, into a number of OSs having usually a higher order. So if one indicates the rows of the PM with the lower order constituent OSs, then the column of the PM, i.e. a vector having preferably at least one non-zero entry, represents the higher order OSs.

The Participations Matrices offer a number of important advantages which includes versatility, ease and efficiency of storage usage and speeding the numerical processes for natural language or in general Ontological Subject processing applications as is demonstrated in this invention. For instance having evaluated the VSM of lower order OSs, which would be a vector, make it easy to evaluate the VSM of higher order OSs (a higher order OS of the composition is in fact a partition of the composition, or a subsystem of the system of knowledge) only by a matrix×vector multiplication.

For example, in one exemplary embodiment of the method, the PM is used to obtain the co-occurrences of each pair of OS in the partitions of the composition. The self-occurrences (the diagonal of the Co-Occurrence Matrix (COM)) is in fact the Frequency of Occurrence (FO) of each OS and can be regarded as one of the "Value Significance Measures" (VSMs) of a lower OS in the composition.

In another important embodiment, using the PMs we proceed to introduce and define an "Association Strength Matrix (ASM)". The association strength is defined as function of co-occurrence of each two OSs divided by the ratio of their probability of occurrences in the composition. The association strength is not symmetric and is shown to be an effective concept and method to identify the value of each OSs in the composition by taking into account the actual patterns of participation of the OSs in the partitions of the composition. The ASM can be represented graphically by an asymmetric and directed graph and network of OSs.

Having obtained the Association Strength Matrix (ASM) the method and algorithm is provided to obtain another important Value Significance Measure which is called the "Association Significance Number (ASN)" of each OS. The ASN is obtained by summing the ASM over one of the dimension and basically shows the cumulative association bonding strength of other OSs to each particular OS. The ASN is less noisy than the FO and take into account the usage or participation patterns of the OSs in the composition.

Additionally using the ASM we introduce the concept of information contribution and particularly the "Differential Conditional Entropy Measure (DCEM)" as an indication of informational contribution of each OSs by considering the difference between the conditional entropy of each $OS_i$ given the rest of participant OSs of the composition and the conditional entropy of the rest of participant OSs given the ith OS. Several other Value Significance Measures (VSMs) have intermediately introduced and their effectiveness are compared by way of exemplary implementations of the method and the algorithms. These measures can yield better clarity that take into account the usage of patterns of participation of the OSs in the composition.

In these preferred embodiments the VSMs of lower order OSs are first evaluated from which the VSMs for higher order OSs can be conveniently calculated. The VSM of a lower order OS is an indication of significance of the role of that OS in the system or body of knowledge that is being investigated. These embodiments are particularly important and useful for those applications that the knowledge of importance of the lower order OSs is crucial such as the applications in the genetics engineering in which the impact and importance of individual parts of the DNA is important for synthesizing or engineering a new gene or knowledge of individual genes are important to study the whole genome.

In accordance with another aspect of the invention the Participation Matrix is used again to obtain Association Strength Matrix (ASM) to consequently build the Ontological Subject Map (OSM) or graph. The OSM can be built from the information of ASM and employing the method and the algorithm that was introduced and explained in the patent application Ser. No. 12/547,879 entitled "System and Method of Ontological Subject Mapping for knowledge Processing Applications" filed on Aug. 26, 2009 by the same applicant. The map is not only useful for graphical representation or the context of the body of knowledge of an input composition, but also can be used to evaluate the value significances of the OSs in the graph as explained in the patent application Ser. No. 12/547,879. Using the ASM, introduced in this application, can also result in better justified Ontological Subject Map (OSM) and the resultant calculated OSs significance value.

Having obtained the VSMs of the lower order OSs one can readily evaluate the VSMs for higher order OSs utilizing the PMs. The VSM of higher order OSs in fact show the importance and significance of the role of that partition in the system of knowledge that is being investigated.

The VSMs then can be employed in many applications. Therefore, in essence using the participation information of a set of lower order OSs into a set of the same or higher order OSs, one has a unified method and process of evaluating the value significance of Ontological Subject of different orders used in a system of knowledge. Depends on the desired application one can use the applicable and desirable embodiments for the intended application such as web page ranking, document clustering, single and multi document summarization/distillation, question answering, graphical representation of the compositions, context extraction and representation, knowledge discovery, novelty detection, composing new compositions, engineering new compositions, composition comparison, as well as other areas such as genetic analysis and synthesize, signal processing, economics, marketing and the like.

Various exemplary applications are also presented with the illustrating block diagrams of the method and algorithm along with the associated systems for performing such applications.

In another aspect the invention provides systems comprising computer hardware, software, internet infrastructure, and other customary appliances of an E-business and cloud computing and services to perform and execute the said method in providing a variety of services for a client/user's desired applications.

DETAILED DESCRIPTION

Figure 1:
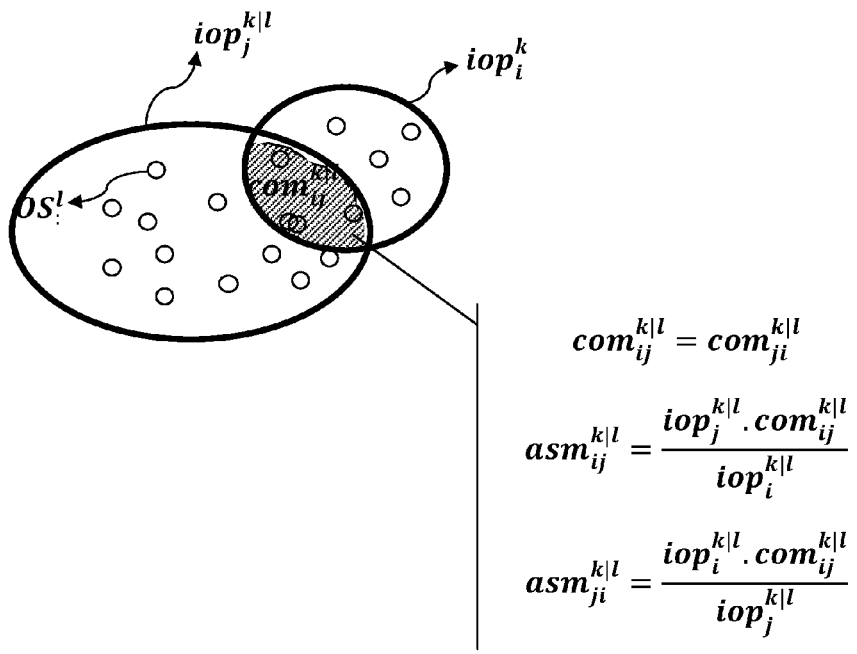
FIG. 1: shows one exemplary illustration of the concept of association strength of a pair of OSs based on their co-occurrence and their probability of occurrences in the partitions of a composition.

In order to describe the disclosure in details we first define a number of terms that are used frequently throughout this description. For instance, the information bearing symbols are called Ontological Subjects and are defined herein below, along with others terms, in the definitions sections.

I-Definitions:

This disclosure uses the definitions that were introduced in the U.S. patent application Ser. No. 12/755,415 filed on Apr. 7, 2010, which is incorporated as a reference, and are recited here again along with more clarifying points according to their usage in this disclosure and the mathematical formulations herein.

I-Definitions:

1. Ontological Subject: symbol or signal referring to a thing (tangible or otherwise) worthy of knowing about. Therefore Ontological Subject means generally any string of characters, but more specifically, characters, letters, numbers, words, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological Subject/s and the abbreviation OS or OSs are used interchangeably.

2. Ordered Ontological subjects: Ontological Subjects can be divided into sets with different orders depends on their length, attribute, and function. For instance, for ontological subjects of textual nature, one may characterizes letters as zeroth order OS, words as the first order, sentences as the second order, paragraphs as the third order, pages or chapters as the fourth order, documents as the fifth order, corpuses as the sixth order OS and so on. So a higher order OS is a combination or a set of lower order OSs or lower order OSs are members of a higher order OS. A network of ontological subjects can also be divided into sets or sets of sets of sub networks, and/or constituent ontological subjects Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a video signal, bits (electrical One and Zero) can be defined as zeroth order OS, the bytes as first order, any sets of bytes as third order, and sets of sets of bytes, e.g. a frame, as fourth order OS and so on. Therefore definitions of orders for ontological subjects are arbitrary set of initial definitions that one should stick to in order to make sense of methods and mathematical formulations presented here and being able to interpret the consequent results or outcomes in more sensible and familiar language.

More importantly Ontological Subjects can be stored, processed, manipulated, and transported only by transferring, transforming, and using matter or energy (equivalent to matter) and hence the OS processing is a completely physical transformation of materials and energy.

3. Composition: is an OS composed of constituent ontological subjects of lower or the same order, particularly text documents written in natural language documents, genetic codes, encryption codes, data files, voice files, video files, and any mixture thereof. A collection, or a set, of compositions is also a composition. Therefore a composition is also an Ontological Subject which can be broken to lower order constituent Ontological Subjects. Equally a network of ontological subjects can also be divided or decomposed into different sub networks or groups which participate into each other. Such networks can be a networks of chemical compound to the connected group of people in a social network, a group of connected webpages and the links, or cognitive graph showing connection and relation of various concepts or entities to each other, etc. The composition of ontological subjects therefore shows or established some types of connections between its ontological subjects by the ways they have been composed together to make up a composition. In this disclosure, the preferred exemplary composition is a set of data containing ontological subjects, for example a webpage, papers, documents, books, a set of webpages, sets of PDF articles, one or more string of genetic codes, one or more genomic data files, an stream of data binary or otherwise, multimedia files, or even simply words and phrases. Compositions are distinctly defined here for assisting the description in more familiar language than a technical language using only the defined OSs notations.

4. Partitions of composition: a partition of a composition, in general, is a part or whole, i.e. a subset, of a composition or collection of compositions. Therefore, a partition is also an Ontological Subject having the same or lower order than the composition as an OS. A network of ontological subjects can also be divided or partitioned into sets or sets of sets of sub networks, and/or constituent ontological subjects. More specifically in the case of textual compositions, partitions of a composition can be chosen to be characters, words, sentences, paragraphs, chapters, webpage, etc. A partition of a composition is also any string of symbols representing any form of information bearing signals such as audio or videos, texts, DNA molecules, genetic letters, genes, and any combinations thereof. However our preferred exemplary definition of a partition of a composition in this disclosure is word, sentence, paragraph, page, chapters and the like, or WebPages, and partitions of a collection of compositions can moreover include one or more of the individual compositions. Partitions are also distinctly defined here for assisting the description in more familiar language than a technical language using only the general OSs definitions.

5. Significance Measure: assigning a quantity, or a number or feature or a metric for an OS from a set of OSs so as to assist the selection of one or more of the OSs from the set. More conveniently and in most cases the significance measure is a type of numerical quantity assigned to a partition of a composition. Therefore significance measures are functions of OSs and one or more of other related mathematical objects, wherein a mathematical object can, for instance, be a mathematical object containing information of participations of OSs in each other, whose values are used in the decisions about the constituent OSs of a composition.

6. Summarization: is a process of selecting one or more OS from one or more sets of OSs according to predetermined criteria with or without the help of value significance and ranking metric/s. The selection or filtering of one or more OS from a set of OSs is usually done for the purposes of representation of a body of data by a summary as an indicative of that body. Specifically, therefore, in this disclosure searching through a set of partitions or compositions, and showing the search results according to the predetermined criteria is considered a form of summarization. In this view finding an answer to a query, e.g. question answering, or finding a composition related or similar to an input composition etc. are also a form of searching through a set of partitions and therefore are a form of summarization according to the given definitions here.

7. The usage of quotation marks " ": throughout the disclosure several compound names of concepts, variable, functions and mathematical objects and their abbreviations (such as "participation matrix", or PM for short, "Co-Occurrence Matrix", or COM for short, "value significance measure", or VSM for short, and the like) will be introduced, either in singular or plural forms, that once or more is being placed between the quotation marks (" ") for identifying them as one object (or a regular expression that is used in this disclosure frequently) and must not be interpreted as being a direct quote from the literatures outside this disclosure."

Now the invention is disclosed in details in reference to the accompanying figures and exemplary cases and embodiments in the following sub sections.

II-Description

The systems and methods that are devised here is to solve the proposed problem of assigning "value significance" quantities to constituent ontological subjects of a composition or a network of ontological subjects. It is further to disclose the methods of measuring the significance of the value/s so that the "Value Significance Measure/s (VSM)" can be used for further processing of many related applications. The systems and methods can be used for applications ranging from search engine document retrieval, document classification, knowledge discovery and research trajectory optimization, question answering, spelling checking, summarization, distillation, automatic composition generation, genetics and genomics, to novel applications in economical systems by evaluating a value for economical entities, financial applications such as financial decision making, decision support systems, stock valuation, target advertising, and as well measuring the influence of a member in a social network, or any other problem that can be represented by graphs and for any group of entities with some kind of association and relations.

Although the methods are general with broad applications, implications, and implementation strategies and technique, the disclosure is described by way of specific exemplary embodiments to consequently describe the methods, implications, and applications in the simplest forms of embodiments and senses.

Also since most of human knowledge and daily information production is recorded in the form of text (or it can be converted to text), the detailed description is focused on textual compositions to illustrate the teachings and the methods and the systems. In what follows the invention is described in several sections and steps which in light of the previous definitions would be sufficient for those ordinary skilled in the art to comprehend and implement the methods, the systems and the applications thereof. In the following section we first set the mathematical foundation of the disclosed method from where we launch into introducing several "value significance measures" (VSMs) and ways of calculating them and their applications.

II-I Participation Matrix Building for a Composition

Assuming we have an input composition of ontological subjects, e.g. an input text, the "Participation Matrix" (PM) is a matrix indicating the participation of each ontological subject in each partitions of the composition. In other words in terms of our definitions, PM indicate the participation of one or more lower order OS into one or more OS of higher or the same order. PM is the most important array of data in this disclosure that contains the raw information from which many other important functions, information, features, and desirable parameters can be extracted. Without intending any limitation on the value of PM entries, in the preferred embodiments throughout most of this disclosure (unless stated otherwise) the PM is a binary matrix having entries of one or zero and is built for a composition or a set of compositions as the following:

1. break the composition to desired numbers of partitions. For example, for a text document we can break the documents into chapters, pages, paragraphs, lines, and/or sentences, words etc.,
2. identify the desired form, number, and order/s of the ontological subject/s of the composition by appropriate methods such as parsing a text documents into its constituent words and/or phrases, sentences, paragraphs etc.,
3. select a desired N number of OSs of order k and a desired M number of OSs of order l (these OSs are usually the partitions of the composition from the step 1) existing in the composition, according to certain predetermined criteria, and;
4. construct a binary N×M matrix in which the ith raw ($R_i$) is a binary vector, with dimension M, indicating the presence of the ith OS of order k, (often extracted from the composition under investigation), in the OSs of order l, (often extracted from the same or another composition under investigation), by having the value of one, and not present by having the value of zero.

We call this binary matrix the Participation Matrix of the order kl ($PM^{kl}$) which can be shown as:
$OS_1^l \ldots OS_M^l$ $$PM^{kl} = \begin{matrix} OS_1^k \\ \vdots \\ OS_N^k \end{matrix} \begin{pmatrix} pm_{11}^{kl} & \ldots & pm_{1M}^{kl} \\ \vdots & \ddots & \vdots \\ pm_{N1}^{kl} & \ldots & pm_{NM}^{kl} \end{pmatrix} \quad (1)$$

where $OS_q^l$ is the qth OS of the lth order (q=1 ... M), $OS_p^k$ is the pth OS of the kth order (p=1 ... N), usually extracted from the composition, and $PM_{pq}^{kl}=1$ if $OS_p^k$ have participated, i.e. is a member, in the $OS_q^l$ and 0 otherwise.

The participating matrix of order lk, i.e. $PM^{lk}$, can also be defined which is simply the transpose of $PM^{kl}$ whose elements are given by:

$$PM_{pq}^{lk} = PM_{qp}^{kl} \quad (2).$$

Accordingly without limiting the scope of invention, the description is given by exemplary embodiments using only the general participation matrix of the order kl, i.e the $PM^{kl}$.

Those skilled in the art can store the information of the PMs, and also other mathematical objects of the present invention, in equivalent forms without using the notion of a matrix. For example each raw/column of the PM can be stored in a dictionary, or the PM be stored in a list or lists in list, or a hash table, a set, a counter, or a SQL database, or any other convenient objects of any computer programming languages such as Python, C, Perl, Java, etc. Such practical implementation strategies can be devised by various people in different ways. Moreover, in the preferred exemplary embodiments the PM entries are binary for ease of manipulation and computational efficiency.

However, in some applications it might be desired to have non-binary entries so that to account for partial participation of lower order ontological subjects into higher orders, or to show or preserve the information about the location of occurrence/participation of a lower order OS into a higher order OSs, or to account for a number of occurrences of a lower OS in a higher OS etc., or any other desirable way of mapping/converting or conserving some or all of the information of a composition into a participation matrix. In light of the present disclosure such cases can also be readily dealt with, by those skilled in the art, by slight mathematical modifications of the disclosed methods herein.

Furthermore, as pointed out before, those skilled in the art can store, process or represent the information of the data objects of the present application (e.g. list of ontological subjects of various order, list of subject matters, participation matrix/ex, association strength matrix/ex, and various types of associational, relational, novel, matrices, co-occurrence matrix, participation matrices, and other data objects introduced herein) or other data objects as introduced and disclosed in the incorporated references (e.g. association value spectrums, ontological subject map, ontological subject index, list of authors, and the like and/or the functions and their values, association values, counts, co-occurrences of ontological subjects, vectors or matrix, list or otherwise, and the like etc.) of the present invention in/with different or equivalent data structures, data arrays or forms without any particular restriction.

For example the PMs, ASMs, OSM or co-occurrences of the ontological subjects etc. can be represented by a matrix, sparse matrix, table, database rows, dictionaries and the like which can be stored in various forms of data structures. For instance each layer of the a PM, COM, ASM, r different types of VSMs and the like or the ontological subject index, or knowledge database/s can be represented and/or stored in one or more data structures such as one or more dictionaries, one or more cell arrays, one or more row/columns of an SQL database, one or more filing systems, one or more lists or lists in lists, hash tables, tuples, string format, zip format, sequences, sets, counters, or any combined form of one or more data structure, or any other convenient objects of any computer programming languages such as Python, C, Perl, Java., JavaScript etc. Such practical implementation strategies can be devised by various people in different ways.

The detailed description, herein, therefore describes exemplary way(s) of implementing the methods and the system of the present invention, employing the disclosed concepts. They should not be interpreted as the only way of formulating the disclosed concepts, algorithms, and the introducing mathematical or computer implementable objects, measures, parameters, and variables into the corresponding physical apparatuses and systems comprising data/information processing devices and/or units, storage device and/or computer readable storage media, data input/output devices and/or units, and/or data communication/network devices and/or units, etc.

The processing units or data processing devices (e.g. CPUs) must be able to handle various collections of data. Therefore the computing units to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

The data/information processing or the computing system that is used to implement the method/s, system/s, and teachings of the present invention comprises storage devices with more than 1 (one) Giga Byte of RAM capacity and one or more processing device or units (i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second (e.g. an Intel Pentium 3, Dual core, i3, i7 series, and Xeon series processors or equivalents or similar from other vendors, or equivalent processing power from other processing devices such as quantum computers utilizing quantum computing devices and units) are used to perform and execute the method once they have been programmed by computer readable instruction/codes/languages or signals and instructed by the executable instructions. Additionally, for instance according to another embodiment of the invention, the computing or executing system includes or has processing device/s such as graphical processing units for visual computations that are for instance, capable of rendering and demonstrating the graphs/maps of the present invention on a display (e.g. LED displays and TV, projectors, LCD, touch screen mobile and tablets displays, laser projectors, gesture detecting monitors/displays, 3D hologram, and the like from various vendors, such as Apple, Samsung, Sony, or the like etc.) with good quality (e.g. using a NVidia graphical processing units).

Also the methods, teachings and the application programs of the presents invention (e.g. FIGS. 9-12 of this disclosure or similar/related systems from the incorporated references) can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;"

Furthermore the terms "storage device, "storage", "memory", and "computer-readable storage medium/media" refers to all types of no-transitory computer readable media such as magnetic cassettes, flash memories cards, digital video discs, random access memories (RAMSs), Bernoulli cartridges, optical memories, read only memories (ROMs), Solid state discs, and the like, with the sole exception being a transitory propagating signal."

The detailed description, herein, therefore uses a straight-forward mathematical notions and formulas to describe exemplary ways of implementing the methods and should not be interpreted as the only way of formulating the concepts, algorithms, and the introduced measures and applications. Therefore the preferred or exemplary mathematical formulation here should not be regarded as a limitation or constitute restrictions for the scope and sprit of the invention which is to investigate the bodies of knowledge and compositions with systematic detailed accuracy and computational efficiency and thereby providing effective tools in knowledge discovery, scoring/ranking, filtering or modification of partitions of a body of knowledge, string processing, information processing, signal processing and the like.

II-II-Value Evaluation of the Ontologica Subjects

After having constructed the $PM^{kl}$ we now launch to explain the methods of evaluating the "value significances" of the ontological subjects of the compositions. One of the advantages and benefits of transforming the information of a composition into participation matrices is that once we attribute something to one of the OSs then we can evaluate the merit of the other OSs in regards to that attribute with different orders using the PMs. For instance, if we find words of particular importance in a composition then we can readily find the most important sentences of the composition wherein the most important sentences contain the most important words in regards to that particular importance.

We explain the method and the algorithm with the step by step formulations that is easy to implement by those of ordinary skilled in the art and by employing computer programming languages and computer hardware systems that can be optimized to perform the algorithm efficiently and produce useful outputs for various desired applications.

Here we first concentrate on value significance evolution of a predetermined order OSs by several exemplary embodiments of the preferred methods to evaluate the value of an OS of the predetermined order within a same order set of OSs of the composition.

Referring to FIG. 1 here, we start with one definition for association of two or more OSs of a composition to each other and show how to evaluate the strength of the association between each two OSs of composition. In FIG. 1 the "association strength" of each two OSs has been defined as a function of their co-occurrence in the composition or the partitions of the composition, and the probability of occurrences of each one of them.

For instance, in the US patent application the U.S. patent application Ser. No. 12/179,363 entitled "ASSISTED KNOWLEDGE DISCOVERY AND PUBLICATION SYSTEM AND METHOD", filed on Jul. 24, 2008, which is incorporated in this application, the applicant has introduced the concept of association value functions for ontological subjects of a composition. Accordingly an ontological subject was represented by a spectrum like function whose variables (e.g. the horizontal axis of the graphical representation of the spectrum) were ontological subjects and the value of the function was called association value function. The association value function was introduced to show the strength of association of (e.g. relatedness, connections, etc.) between an ontological subjects with other ontological subjects based on count of their co-occurrences within certain proximities, and the importance (e.g. popularity or occurrence counts, or other measures of value significances as defined and disclosed in the incorporated references herein) of the associated ontological subjects.

FIG. 1, shows the concept and rational of this definition for association strength according to this disclosure. The larger and thicker elliptical shapes are indicative of the probability of occurrences of $OS_i^k$ and $OS_j^k$ in the composition that were driven from the data of $PM^{kl}$ and wherein the small circles inside the area is representing the $OS^l$ s of the composition. The overlap area shows the common $OS^l$ between the $OS_i^k$ and $OS_j^k$ in which the have co-occurred, i.e. those partitions of the composition that includes both $OS_i^k$ and $OS_j^k$. The co-occurrence number is shown by $com_{ij}^{k|l}$ which is an element of the "Co-Occurrence Matrix (COM)" (as will be introduced later) and essentially showing that how many times $OS_i^k$ and $OS_j^k$ has participated jointly into the OSs of the order l of the composition.

From $PM^{kl}$ one can easily arrive at the CO-Occurrence Matrix $COM^{kl}$ for OSs of the same order as follow:

$$COM^{k|l}=PM^{kl}*(PM^{kl})' \qquad (3),$$

where the "'" and "*" show the matrix transposition and multiplication operation respectively. The COM is a N×N square matrix. This is the co-occurrences of the ontological subjects of order k in the partitions (ontological subjects of order l) within the composition and is one indication of the association of OSs of order k obtained from their pattern of participations in the OSs of order l of the composition.

Having calculated the $COM^{k|l}$ we define the association strength between $OS_j^k$ and $OS_i^k$ as shown in FIG. 1. The association strengths play an important role in the value significance evaluation of OSs of the compositions and, in fact, can be shown as entries of a new matrix called here the "Association Strength Matrix ($ASM^{k|l}$)" whose entries will be defined to show the concept and rational of association strength according to one exemplary embodiment of the invention as the following:

$$asm_{ji}^{k|l} = c\frac{com_{ij}^{k|l}}{\left(\frac{iop_j^{k|l}}{iop_i^{k|l}}\right)} = c\frac{com_{ij}^{k|l} \cdot iop_i^{k|l}}{iop_j^{k|l}}, i, j = 1 \ldots N, \qquad (4)$$

where c is a predetermined constant or a predefined function of other variables in Eq. 4, $com_{ij}^{k|l}$ are the individual entries of the $COM^{k|l}$ showing the co-occurrence of the $OS_i^k$ and $OS_j^k$ in the partitions, and the $iop_i^{k|l}$ and $iop_j^{k|l}$ are the "independent occurrence probability" of $OS_i^k$ and $OS_j^k$ in the partitions respectively, wherein the occurrence is happening in the partitions that are OSs of order l. However in this exemplary case we conveniently considered the case where c=1 as shown in FIG. 1. The probability of independent occurrence in a partition is the independent "Frequency of Occurrences", i.e. the number of times an $OS^k$ has been appeared or occurred in the composition or its partitions, divided by the total possible number of occurrences of that OS, i.e. the number of partitions when we do not consider repeated occurrences of an $OS^k$ in any partitions which is the case in this exemplary description.

The independent frequency of occurrences or the independent number of occurrences can be obtained by counting the occurrences of OSs of the particular order, e.g. counting the appearances of particular word in the text or counting its total occurrences in the partitions, or more conveniently be obtained from the $COM^{k|l}$. The "Frequency of Occurrences" or the independent number of occurrences of $OS_i^k$ is called here $FO_i^{k|l}$ and can, for convenience, be given by:

$$FO_i^{k|l}=com_{ii}^{k|l}. \qquad (5)$$

which is basically the elements on the main diagonal of the $COM^{k|l}$. The "Independent Occurrence Probability" (IOP) in the partitions (used in Eq. 4), is a function of "Frequency of Occurrences" or number of occurrence of the ontological subject and in one embodiment can be given by:

$$iop_i^{k|l} = \frac{FO_i^{k|l}}{M}, \quad i = 1 \ldots N. \qquad (6)$$

Introducing quantities from Eq. 5, and 6 into Eq. 4 the association strength therefore can be calculated. In a particular case, it can be seen that in Eq. 4, the association strength measure of each OS with itself is proportional to its frequency of occurrence. That is Eq. 4 results in $asm_{ii}^{k|l}=c.FO_i^{k|l}$. However, in order to have a normalized value for $asm_{ii}^{k|l}$, i.e. $asm_{ii}^{k|l}=1$, then one can use the case where $c=1/FO_i^{k|l}$ in the Eq. 4 to have self association strength of normalized to 1. In another instance one may factors out the term "$c/iop_j^{k|l}$" by having $c=iop_j^{k|l}$ so that the association strength of Eq. 4 reduces to $asm_{ji}^{k|l}=c2.com_{ij}^{k|l}.FO_i^{k|l}$, i,j=1 . . . N, wherein c2 could be a normalization factor or a function of other variables of Eq. 4.

Nevertheless, when c=1 in Eq. 4 the results of the association strength calculations become much more pronounced and distinguishable making it suitable to find the true but less obvious associations of an OS. Furthermore, more parameters can be introduced in front of each of the variables in the equations above to have general enough formulations. However those parameters or more variables have been avoided here to prevent un-necessary complication of the formulations.

It is important to notice that the association strength defined by Eq. 4, is not symmetric and generally $asm_{ji}^{k|l} \neq asm_{ij}^{k|l}$. One important aspect of the Eq. 4 is that in this invention it has been pointed out that associations of OSs of the compositions that have co-occurred in the partitions are not necessarily symmetric and in fact it is noticed in the invention that asymmetric association strength is more rational and better reflects the actual semantic relationship situations of OSs of the composition.

To illustrate further in this matter, Eq. 4 basically says that if a less popular OS co-occurred with a highly popular OS then the association of less poplar OS to highly popular OS is much stronger than the association of a highly popular OS having the same co-occurrences with the less popular OS. That make sense, since the popular OSs obviously have many associations and are less strongly bounded to anyone of them so by observing a high popular OSs one cannot gain much upfront information about the occurrence of less popular OSs. However observing occurrence of a less popular OSs having strong association to a popular OS can tip the information about the occurrence of the popular OS in the same partition, e.g. a sentence, of the composition.

A very important, useful, and quick use of Eq. 4 is to find the real associates of a word, e.g. a concept or an entity, from their pattern of usage in the partitions of textual compositions. Knowing the associates of words, e.g. finding out the associated entities to a particular entity of interest, has many applications in the knowledge discovery and information retrieval. In particular, one application is to quickly get a glance at the context of that concept or entity or the whole composition under investigation.

Figure 2:
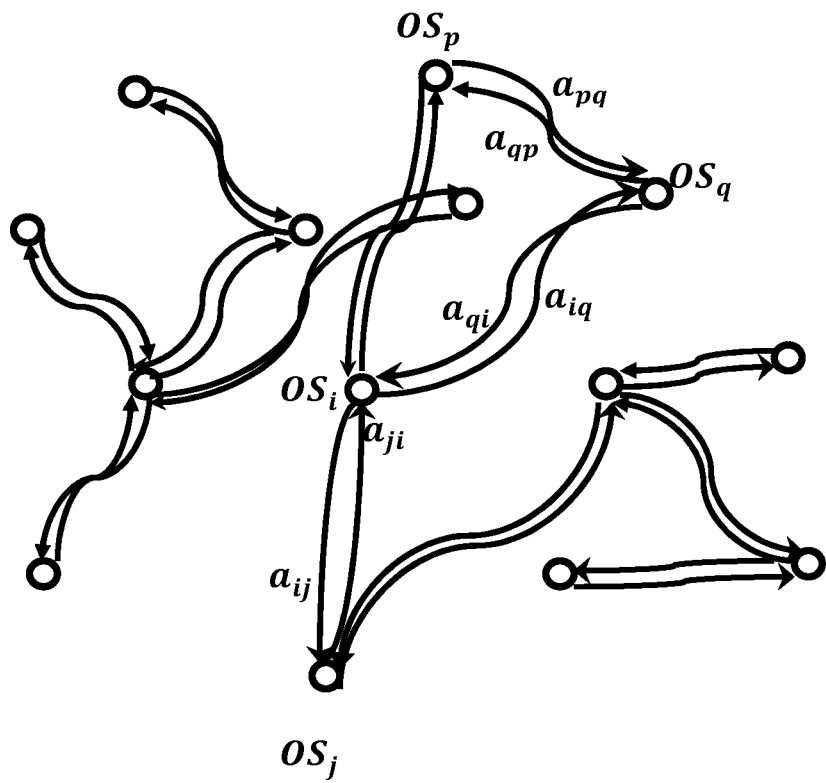
FIG. 2: shows one exemplary embodiment of a directed asymmetric network or graph corresponding to an association strength matrix.

In accordance to another aspect of the invention, one can recall from graph theories that each matrix can be regarded as an adjacency matrix of a graph or a network. Consequently, FIG. 2 shows a graph or a network of OSs of the composition whose adjacency matrix is the Association Strength Matrix (ASM). As seen the graph corresponding to the ASM can be shown as a directed and asymmetric graph or network of OSs. Therefore having the ASM one can represent the information of the ASM graphically. On the other hand by having a graph one can transform the information of the graph into an ASM type matrix and use the method and algorithm of this application to evaluate various value significance measures for the nodes of the graph or network. Various other graphs can be depicted and generated for each of the different matrixes introduced herein. FIG. 2 further demonstrate that how any composition of ontological subjects can be transformed (using the disclosed methods and algorithms) to a graph or network similar to the one shown in FIG. 2 showing the strength of the bounding between the nodes of the graph.

Using the association strength concept one can also quickly find out the context of the compositions or visualize the context by making the corresponding graphs of associations as shown in FIG. 2. Furthermore, the association strengths become instrumental for identifying the real associates of any OS within the composition. Once the composition is large or consist of very many documents one can identify the real associations of any ontological subject of the universe. Such a real association is useful when one wants to research about a subject so that she/he can be guided through the associations to gain more prospects and knowledge about a subject matter very efficiently. Therefore a user or a client can be efficiently guided in their research trajectory to gain substantial knowledge as fast as possible. For instance a search engine or a knowledge discovery system can provide its clients with the most relevant information once it has identified the real associations of the client's query, thereby increasing the relevancy of search results very considerably.

As another example, a service provider providing knowledge discovery assistance to its clients can look into the subjects having high associations strength with the subject matter of the client's interest, to give guidance as what other concepts, entities, objects etc. should she/he look into to have deeper understanding of a subject of interest or to collect further compositions and documents to extend the body of knowledge related to one or more subject matters of her/his/it's interest.

According to another aspect of the invention, we also put a value of significance on each OS based on the amount of information that they contribute to the composition and also by the amount of information that composition is giving about the OSs.

To evaluate the information contribution of each OS we use the information about the association strength as being related to the probability of co-occurrence of each two OSs in the partitions of the composition. The probability of occurrence $OS_i^k$ after knowing the occurrence of $OS_j^k$ in a partition, e.g. $OS^l$, is considered to be proportional to the association strength of $OS_j^k$ to $OS_i^k$, i.e. the $asm_{ji}^{k|l}$. Therefore we define yet another function named "Conditional Occurrence Probability ($COP^{k|l}$)" here as being proportional to $asm_{ji}^{k|l}$. Hence to have entries of $COP^{k|l}$ as the following:

$$cop^{k|l}(i|j) = p^{k|l}(OS_i^k | OS_j^k) \propto asm_{ji}^{k|l}. \tag{7}$$

Considering that $\Sigma_j iop_j^{k|l} \cdot cop^{k|l}(i|j) = iop_i^{k|l}$ (total conditional probabilities of occurrences of $OS_i^k$ in a partition is equal to independent occurrence probability of $OS_i^k$ in that partition) we arrive at:

$$cop^{k|l}(i|j) = \frac{iop_i^{k|l} \cdot asm_{ji}^{k|l}}{\Sigma_j iop_j^{k|l} \cdot asm_{ji}^{k|l}} \tag{8}$$

The matrix $cop^{k|l}$ (i|j) can be made to a row stochastic (assuming the i showing the index of rows) but spars (having many zero entries) and in terms of graph theories jargon it could be corresponded to an incomplete graph or network. However if for mathematical or computational reasons it becomes necessary, it can be made to become a matrix that corresponds to a complete graph (every node in the graph is connected directly to all other nodes) by subtracting an small amount from the non-zero elements and distribute it into the zero elements so that processing of the matrix for further purposes can be performed without mathematical difficulties (no division by zero etc.).

Now that we have defined and obtained preliminary mathematical objects of the invention, we proceed with defining several illustrating but important "value significance measures" (VSMs) and comparing them in terms of computational complexity and usefulness. Mathematically VSMs are vectors that correspond to a number of OSs of interest in the composition. Obviously the first indication of significance of an OS in the composition is the frequency of occurrence or number of times that an OS has been appeared in the composition or its partitions. The first Value Significance Measure of $OS_i^k$ which is called $VSM1_i^k$ then would be:

$$VSM1_i^{k|l} = FO_i^{k|l} \quad i=1 \ldots N \tag{9}$$

This is the simplest and most straightforward measure of significance of an OS in the composition. However when the composition or collection of compositions become large (contain very many OSs) the Frequency of Occurrences of many of OSs can become very close and therefore noisy making it not a very suitable measure of intrinsic significances. Specially as we will see in the next section when using this measure of significance to evaluate the value significance of higher order OSs, e.g. $VSM1_i^{l|k}$, the results could become noisy and less useful. That is because the frequency count or Frequency of Occurrence (FO) alone does not carry the information of the usage pattern and co-occurrence patterns of OSs with each other. However for many applications this measure of significance could be satisfactory considering the simplicity of the processing.

In accordance with another aspect of the invention, the second measure of significance is defined in terms of the "cumulative association strength" of each OS. This measure can carry the important information about the usage pattern and co-occurrence patterns of an OS with others. So the second value significance measure $VSM2_i^k$ for an $OS_i^k$ is defined versus the cumulative association strength that here is called "Association Significance Number ($ASN_i^k$)", will be:

$$VSM2_i^{k|l} = ASN_i^{k|l} = \Sigma_j asm_{ji}^{k|l} \quad i,j=1 \ldots N \tag{10}$$

The $VSM2_i^k$ is much less noisy than $VSM1_i^k$ and fairly simple to calculate. It must be noticed that $ASN_i^k$ is an indication of how strong other OSs are associated with $OS_i^k$ and not how strong $OS_i^k$ is associated with others. Alternatively it would be important to know a total quantity for association strength of an $OS_i^k$ to others which is $\Sigma_j asm_{ij}^{k|l}$ (the difference here with Eq. 10 is in the ij instead of ji in the summation). This quantity is also an important measure which shows overall association strength of $OS_i^k$ with others. The difference of $\Sigma_j asm_{ji}^{k|l} - \Sigma_j asm_{ij}^{k|l}$ is also an important indication of the significance of the $OS_i^k$ in the composition. The latter quantity or number shows the net amount of importance of and OS in terms of association strengths exchanges or forces. This quantity can be visualized by a three dimensional graph representing the quantity $\Sigma_j asm_{ji}^{k|l} - \Sigma_j asm_{ij}^{k|l}$. A positive number would indicate that other OSs are pushing the $OS_i^k$ up and negative will show that other OSs have to pull the $OS_i^k$ up in the three dimensional graph. Those skilled in the art can yet envision other measures of importance and parameters for investigation of importance of an OS in the composition using the concept of association strengths.

As an example of other measures of importance, and in accordance with another aspect of the invention and as yet another measure of value significance we notice that it would be helpful and important if one can know the amount of information that an OS is contributing to the composition and vice versa. To elaborate further on this value significance measure we notice that it is important if one can know that how much information the rest of the composition would have gained if an OS has occurred in the composition, and how much information would be lost when on OS is removed from the composition. Or saying it in another way, how much the composition is giving information about the particular OS and how much that particular OS add to the information of the composition. The concept of conditional entropy is proposed and is applicable here to be used for evaluation of such important value measure. Therefore, we can use the defined conditional occurrence probabilities (COP) to define and calculate "Conditional Entropy Measures (CEMs)" as another value significance measure.

Accordingly, yet a slightly more complicated but useful measure of significance could be sought based on the information contribution of each $OS_i^k$ or the conditional entropy of $OS_i^k$ given the rest of $OS^k$ s of the composition are known. The third measure of value significance therefore is defined as:

$$VSM3_i^{k|l} = CEM1_i^{k|l} = H1_i^{k|l} = H_j(OS_i^k | OS_j^k) = -\Sigma_j iop_j^{k|l} \cdot cop^{k|l}(i|j) \log_2(cop^{k|l}(i|j)), i,j=1\ldots N \quad (11)$$

wherein $H_j$ stands for Shannon-defined type entropy that operates on j index only. In Eq. 11 any other basis for logarithm can also be used and $CEM1_i^{k|l}$ stands for first type "Conditional Entropy Measure" and $H1_i^{k|l}$ is to distinguish the first type entropy according to the formulations given here (as opposed to the second type entropy which is given shortly). This is the average conditional entropy of $OS_i^k$ over the M partitions given that $OS_j^{k|l}$ has also participated in the partition. That is every time $OS_i^k$ occurs in any partition we gain H bits of information.

And in accordance with yet another aspect of the invention another value significance measure is defined as:

$$VSM4_i^{k|l} = CEM2_i^{k|l} = H2_i^{k|l} = H_j(OS_j^k | OS_i^k) = -\Sigma_j cop^{k|l}(j|i) \log_2(cop^{k|l}(j|i)), i,j=1\ldots N \quad (12)$$

where $H_j$ stands for Shannon-defined type entropy that operates on j index only again, and wherein $CEM2_i^{k|l}$ stands for the second type "Conditional Entropy Measure" and $H2_i^{k|l}$ is to distinguish the second type entropy according to the formulations given here. That is the amount of information we gain any time an $OS^k$ other than $OS_i^k$ occurs in a partition knowing first that $OS_i^k$ has participated in the partition.

And in accordance with another aspect of the invention yet another important measure is defined by:

$$VSM5_i^{k|l} = DCEM_i^{k|l} = CEM1_i^{k|l} - CEM2_i^{k|l} = VSM3_i^{k|l} - VSM4_i^{k|l}, i=1\ldots N \quad (13)$$

where $DCEM_i^{k|l}$ stands for "Differential Conditional Entropy Measure" of $OS_i^k$. The $DCEM_i^{k|l}$ and is a vector having N element as is the case for other VSMs. The $VSM5^{k|l}$ is an important measure showing the net amount of entropy or information that each OS is contributing to or receiving from the composition. Though the total sum of $DCEM_i^{k|l}$ over the index i, is zero but a negative value of $VSM5_i^{k|l}$ (i.e. $DCEM_i^{k|l}$) is an indication that the composition is about those OSs with negative $VSM5^{k|l}$. The $VSM5^{k|l}$ is much less nosier than the other value significance measures but is in a very good agreement (but not exactly matched) with $VSM2^{k|l}$, i.e. the association significance number ($ASN^{k|l}$). This is important because calculating ASN is less process intensive yet yields a very good result in accordance with the all important $DCEM^{k|l}$.

Also important is that either of $CEM1^{k|l}$ or $CEM2^{k|l}$ can be also used (multiplying either one by $FO_i^{k|l}$) for measuring or evaluating the real information of the composition in terms of bits (wherein bit is a unit of information according to the Information Theory) which could be considered as yet another measure of value significance for the whole composition or the partitions therein. For instance, this measure can be used to evaluate the merits of a document among many other similar or any collection of documents. The information value of the OSs or the partitions (by addition the individual information of the its constituent OSs) is a very good and familiar measure of merit and therefore can be another good quantity as an indication of value significance.

Those skilled in the art can use the teachings, concepts, methods and formulations of value significance evaluation of ontological subjects and the partitions of the composition with various other alterations and for many applications. We now lunch into describing a number of exemplary embodiments of implementing the methods and the exemplary related systems of performing the methods and some exemplary applications in real life situations.

Figure 3:
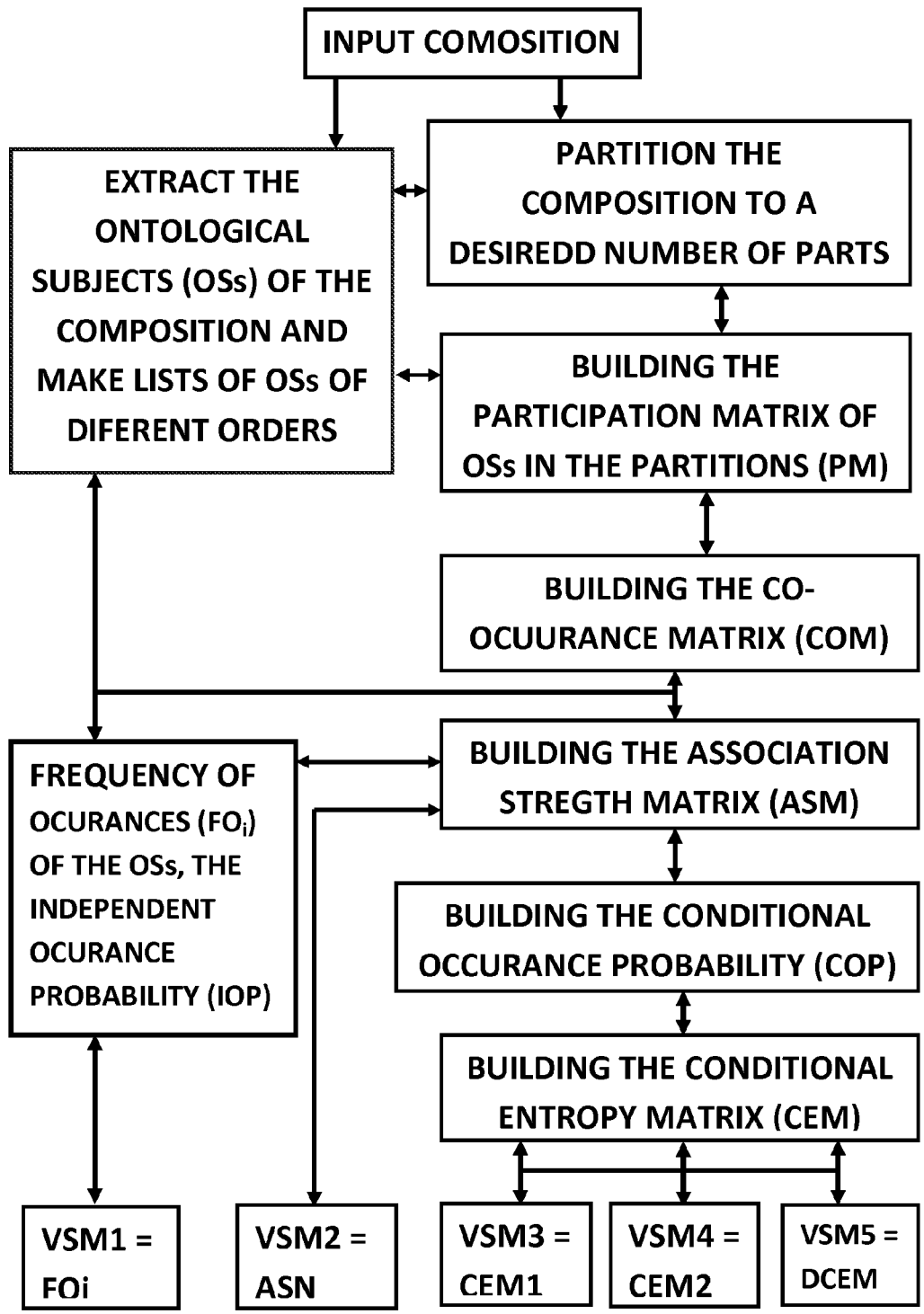
FIG. 3: shows a block diagram of one preferred embodiment of the method and the algorithm for calculating a number of exemplary "Value Significance Measures" of the of ontological subjects.

Referring to FIG. 3 now, it shows the block diagram of one basic algorithm of calculating a number of "Value Significance Measures" of the Ontological Subjects of an input composition according to the teachings of the invention. As seen the input composition is partitioned to a number of desirable partitions and the lower order OSs of partitions are also extracted and indexed in various lists of OSs of different orders. In the preferred embodiment of the method the partitions would be textual semantics units of different lengths such as paragraphs, or sentences and chapters. Again here we consider words and some special characters and symbols as OS order 1, the sentences as OS order 2, the paragraphs as order 3, the sections as OS order 4, and individual documents as OSs of order 5. The input composition can be a single man-made article, a number of documents, or a huge corpus etc. There is no limit on the length of the composition. In an extreme case the input composition might be the whole internet repositories.

Looking at FIG. 3 again, it further shows the steps in detail for performing the methods and the algorithms. After partitioning and extracting the OSs of desired orders, the participation matrix or matrices of desired dimensions and orders are built from which the co-occurrence matrix/s (COM) is built. The Frequency of Occurrence (FO) can be obtained by counting the OSs while extracting them from the composition or can be obtained from the Co-Occurrence Matrix as indicated in Eq. 5, and hence obtaining the Independent Occurrence Probability (IOP) of each OS of the desired order using Eq. 6. The first value significance measure (VSM1) can then be calculated according to Eq. 9. Having obtained the IOP and COM consequently the "Association Strength Matrix (ASM)" is calculated, (according to Eq. 4, and 6) from which the second "Value Significance Measure (VSM2)" is obtained using Eq. 10. Having ASM, thereafter the "Conditional Occurrence Probability" (COP) for each desirable pairs of OSs are calculated as the entries of the COP matrix (according to Eq. 8).

From the Conditional Occurrence Probability the various combinations of Conditional Entropy Measures, i.e. CEM1, CEM2, DCEM are calculated according to Eq. 11, 12, and 13.

It is noted that obviously one can select only the desirable OSs of any order in building one or more of the matrix objects of the invention. Moreover, one does not need necessarily to calculate all of the VSMs that have been included in the general algorithm of FIG. 3. FIG. 3 is for showing one basic exemplary embodiment to illustrate the relations and the method and algorithm of calculating or evaluating a number of distinct VSMs that were disclosed in the description.

Figure 4A:
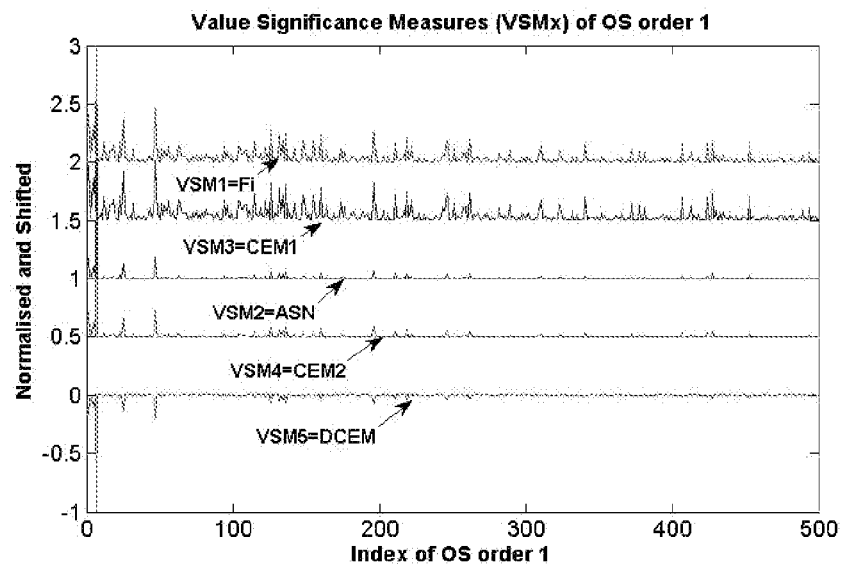
FIG. 4*a, b* shows depictions of exemplary graphs of the various resultant normalized VSMs for first order OSs participated in an exemplary composition.

FIG. 4a compares these different measures of significance for an exemplary textual input composition. The VSMs have been evaluated for a short text, actually a research paper, as an example to illustrate the normalized various measures of value significances disclosed in this invention. The OSs of the first order are the words and the second order OSs are the sentences of the text. These data have been calculated from the $PM^{12}$ of the exemplary text. This is only to demonstrate the calculation and implementation of the method and algorithm and an exemplary illustrating figure for representing the VSMx (x is 1, 2, 3, . . . etc). The results for large bodies of knowledge and corpuses must be more well pronounced and having more meaningful interpretations. The resulting similar figures for different compositions can be substantially different from the depicted exemplary figures presented here. Furthermore, more figures and curves can be made which could be substantially different and/or show various other functions, values, and other desired parameters.

As seen in FIG. 4a the $VSM1_i^{1|2}$ and $VSM3_i^{1|2}$, for the exemplary composition, have very good resemblance and are highly similar and correlated showing that the CEM1 almost resembles the FO and IOP while the $VSM2_i^{1|2}$ and $VSM4_i^{1|2}$ also resemble each other very well but a lot less noisy than $VSM1_i^{1|2}$ and $VSM3_i^{1|2}$. The $VSM5_i^{1|2}$ (DCEM) also is very similar to $VSM2_i^{1|2}$ and $VSM4_i^{1|2}$ but the correlation is negative (close to −1).

It should be emphasized that the results depicted in FIG. 4a and b, observations, and the interpretations are for a very particular input composition and should not be viewed as general behaviors of the functions and objects that are introduced in this invention. They are only depicted here to show exemplary illustrating ways of investigating the results and the computations of the functions and mathematical objects of the invention. The method and the formulation however is general and is applicable to any size and type of composition as long as the computation expenditure allows.

The interesting and important observation is that the $VSM3_i^{1|2}$, i.e. Conditional Entropy Measure of type 1 (Eq. 11), has followed the Frequency of Occurrence (FO) or equivalently the Independent Occurrence Probability $iop_i^{1|2}$ (Eq. 7). That means the behavior of the entropy of $OS_i^1$ knowing the rest of the composition (Eq. 11) is almost independent of the interrelationships of the OSs in this composition. So knowing the rest of the composition does not affect the general form of the CEM1 from the independent occurring entropy. i.e the $-iop_i^{k|l} \log_2 iop_i^{k|l}$ which will be quite similar to the IOP or FO.

However, the $VSM4_i^1$, i.e. Conditional Entropy Measure of type 2 (Eq. 12), has only followed the Association Strength Number (ASN) and although much less noisy but follow the OSs with high Independent Occurrence Probability $iop_i^{1|2}$ (Eq. 7). That means the behavior of the entropy of the rest of composition knowing the $OS_i^1$ depends on the ASN and strength of the $OS_i^1$ association (Eq. 10 or 12) and is in favor of the highly popular OSs. So knowing the highly popular OSs contribute greatly to the Conditional Entropy Measure of type 2 (Eq. 12).

More importantly is the behavior of DCEM, the sum of DCEM is zero but it has negative values for highly popular (large FO) OSs. That means for those popular OSs who have many real associates the net entropy or information contribution is negative while for the less popular is positive. An interpretation could be given that all OSs of the composition are there to describe and give information about the popular OSs who have real (strong enough) associations. It implies that not all the popular OSs are important if they do not have real bounded associates. The real bounding is the reflection of the usage and the patterns of OSs together in the composition. In other words those OSs having a high value significance are usually the popular ones but the reverse is not always true.

Another explanation is that most popular OSs have many associates or have co-occurred with many other OSs. Those many other associates have been used in the composition to describe the most popular OSs. In other words a natural composition (good intentioned composed composition) is mostly about some of the most popular OSs of the composition. So it is not only the Frequency of Occurrence that count here but the pattern of their usage and the strength of their association (which is asymmetric). In conclusion the negative DCEM means other OSs are giving away information about those OSs with negative DCEM. This feature can be useful for keyword extraction or tagging or classification of documents beside that it shows the importance and significance of the OS having negative DCEM.

Figure 4B:
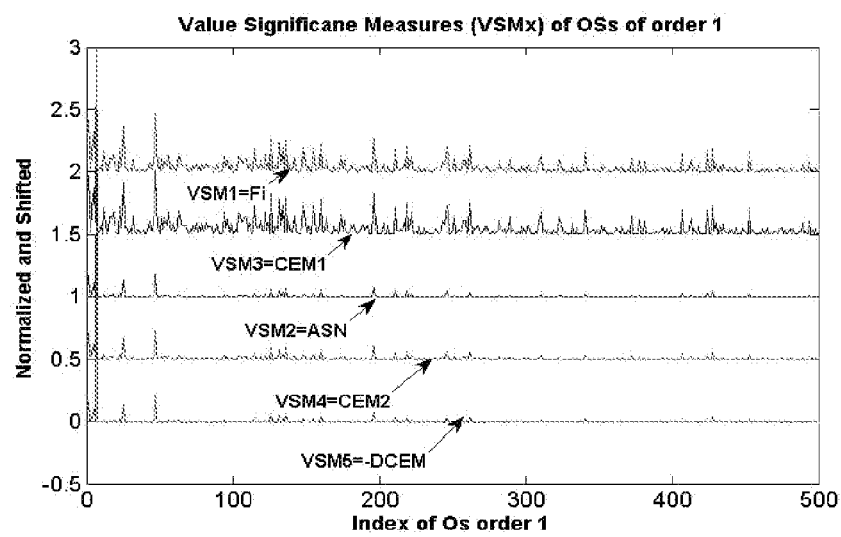

FIG. 4b, shows the same graph as FIG. 4a, but the $VSM5_i^1$, i.e. DCEM, has been multiplied by −1 to make it easier for visual comparison of different VSMs. As seen better here, again $VSM5_i^1$ (DCEM) and $VSM4_i^1$ (CEM2) and $VSM2_i^1$ (ASN) have similar behavior.

Those OSs with the negative DCEM or high ASN can be used for classification of compositions. However investigation of the differences in the various VSMs can also reveal the hidden relationships and their significance as well. For example if an OS has gained a better normalized rank in $VSM5_i^1$ compared to $VSM1_i^1$ then that can point to an important novelty or an important substance matter. Therefore those experts in the art can yet envision other measures of significance employing one or more of these VSMs without departing from scope, concepts and the purpose of this invention.

It also should be emphasized again that the results depicted in FIG. 4a and b, observations, and the interpretations are for a very particular input composition. They are only depicted here to show exemplary illustrating ways of investigating and representing the results and the computations of the functions and mathematical objects of the invention.

It is also evident that at this stage and in accordance with the method and using on eor more of the participation matrix and/or the consequent matrices one can still evaluate the significance of the OSs by building a graph and calculating the centrality power of each node in the graph by solving the resultant eigen-value equation of adjacency matrix of the graph as explained in patent application Ser. No. 12/547,879 and the patent application Ser. No. 12/755,415.

Figure 5:
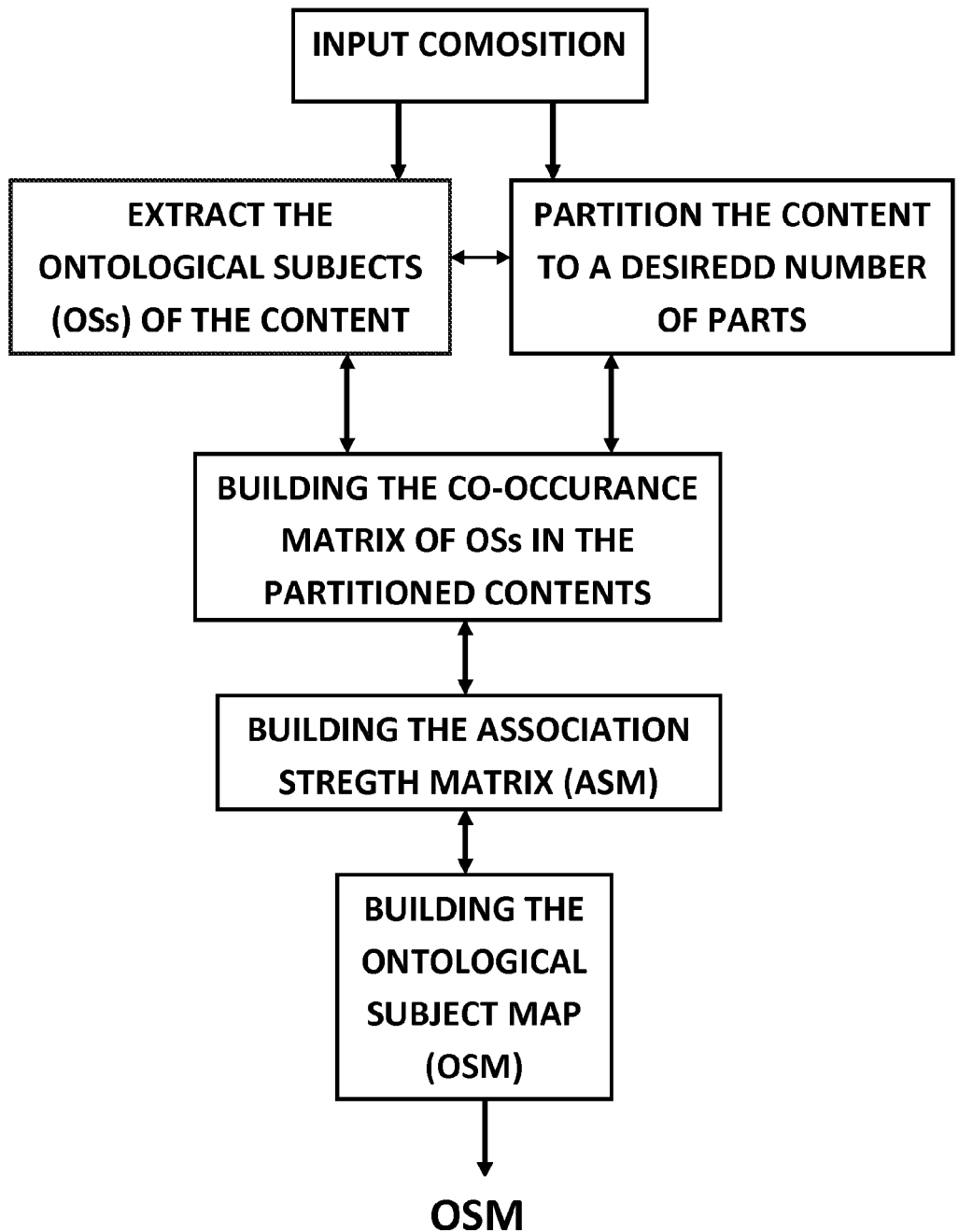
FIG. 5: shows a block diagram of the method and the algorithm of building the Ontological Subject Maps (OSM) from the Association Strength Matrix (ASM) which is built for and from an input composition.

FIG. 5 therefore shows the block diagram of one basic exemplary embodiment in which it demonstrates a method of using the association strengths matrix (ASM) to build an Ontological Subject Map (OSM) or a graph. The map is not only useful for graphical representation and navigation of an input body of knowledge but also can be used to evaluate the value significances of the OSs in the graph as explained in the patent application Ser. No. 12/547,879 entitled "System and Method of Ontological Subject Mapping for knowledge Processing Applications" filed on Aug. 26, 2009 by the same applicant. Utilization of the ASM introduced in this application can result in better justified Ontological Subject Map (OSM) and the resultant calculated significance value of the OSs.

However, according to the exemplary results of FIG. 4*a* and *b*, one might prefer value significance measures of VSM2$^{k|l}$, i.e. the ASN$^{k|l}$, and the VSM5$^{k|l}$, i.e. DCEM$^{k|l}$, which yield sharper measures of an OS value in the composition with reasonable processing complexity.

The association matrix could be regarded as the adjacency matrix of any graphs such as social graphs or any network of any thing. For instance the graphs can be built representing the relations between the concepts and entities or any other desired set of OSs in a special area of science, market, industry or any "body of knowledge". Thereby the method becomes instrumental at identifying the value significance of any entity or concept in that body of knowledge and consequently be employed for building an automatic ontology. The VSM1, 2, . . . 5$^{k|l}$ and other mathematical objects can be very instrumental in knowledge discovery and research trajectories prioritizations and ontology building by indicating not only the important concepts, entities, parts, or partitions of the body of knowledge but also by showing their most important associations.

Various other value significance measures using one or more functions, matrices and variables can still be proposed without departing from the scope, sprit, and the concepts introduced in this invention. For instance sum of the elements of the Co-Occurrence Matrix (COM) over the row/column can also be considered as yet another VSM.

Nevertheless, one might prefer to use VSM of VSM2, VSM4, or VSM5, for her/his application, which takes into account the usage and pattern of usage of OSs to each other in the form of the defined exemplary association strength as shown in FIG. 1.

The VSM has many useful and important applications, for instance the words of a composition with high normalized VSM can be used as the automatic extraction of the keyword and relatedness for that composition. In this way a plurality of compositions and document can be automatically and much more accurately be indexed under the keywords in a database. Another obvious application is in search engines, webpage retrieval, and many more applications such as marketing, knowledge discovery, target advertisement, market analysis, market value analysis of economical enterprises and entities, market research related areas such as market share valuation of products, market volume of the products, credit checking, risk management and analysis, automatic content composing or generation, summarization, distillation, question answering, and many more.

In the next section the value significances of the lower order OSs, e.g. words, are used to evaluate the value significances of larger parts of the composition e.g. paragraphs, sentences, or documents of a collection of documents.

II-II-Value Evaluation of the Higher Order Ontologica Subjects

The value significance of higher order OSs, e.g. order l in here, can be evaluated either by direct value significance evaluation similar to the lower order OSs, or can be derived from value significance of the participating lower orders into higher order. Conveniently one can use the VSMx$_i^{k|l}$ (x=1, 2 . . . 5) and the participation matrix PM$^{kl}$ to arrive at the VSMx$_q^{l|k}$ of higher order OSs or the partition of the composition as the followings:

$$\text{VSMx}_p^{l|k} = \Sigma_p \text{VSMx}_p^{k|l} * \text{pm}_{pq}^{kl} \quad (14).$$

Eq. (14) can also be written in its matrix form to get the whole vector of value significance measure of OSs of order l|k (l given k). i.e. VSMx$^{l|k}$, as a function of the participation matrix PM$^{kl}$ and the vector VSMx$^k$.

Moreover other methods of value significance such as the ones introduced in the patent application Ser. No. 12/755, 415 can be employed. Again the most convenient one could be:

$$\text{VSM1}^{l|k} = (\text{PM}^{kl})^{'*} \text{VSM1}^{k|l} = (\text{PM}^{kl})^{'*} \text{FO}^{k|l} \quad (15)$$

which can be shown to be a special case of Semantic Coverage Extent Number (SCEN) introduced in the provisional patent Ser. No. 12/755,415, when the similarity matrix (see the Ser. No. 12/755,415 application) is simply SM$^{l|k}$=(PM$^{kl}$)$^{'*}$PM$^{kl}$ and SCEN$_i^{l|k}$=$\Sigma_j$sm$_{ij}^{l|k}$. Depends on the application, the size of the composition, available processing power and the needed accuracy, one can select to use one or more of the Value Significance Measures (VSMs) for the desired applications.

In one preferred embodiment the VSM4$_i^k$ (i.e. CEM2$_i^k$) is used for better clarity and sharpness.

Figure 6A:
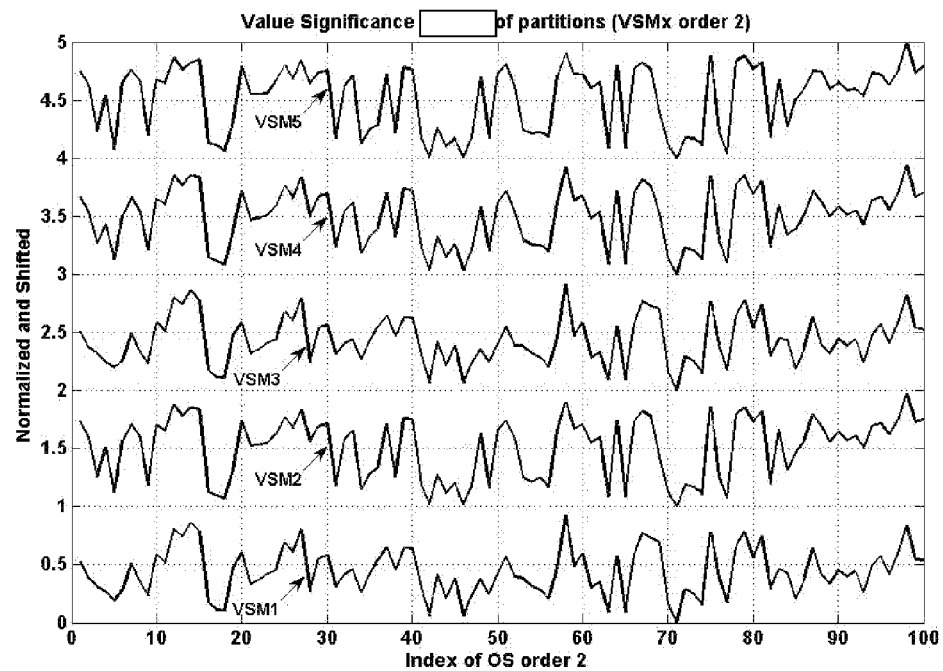
FIG. 6*a, b, c, d*: show the normalized Value Significance Measures of second order (sentences) OSs of the exemplary input composition of FIG. 4.

FIG. 6*a, b, c*, show various normalized VSMx of order 2 (Value Significance Measures of the sentences) for said exemplary composition of FIG. 4*a* and *b*. Correlation calculations show that all the VSMx$_i^{2|1}$ are highly correlated. However looking more closely at FIG. 6*a*, reveals that the VSM1$_i^{2|1}$ and VSM3$_i^{2|1}$ are quite similar (highly correlated) while VSM2$_i^{2|1}$ VSM4$_i^{2|1}$, and VSM5$_i^{2|1}$ are also quite similar but less noisy with better pronounced peaks than VSM1$_i^2$.

Nevertheless, for fast and quick, or coarse, value significance evaluation of the higher order calculation one can conveniently use Eq. 15. However, for better results perhaps it can safely be stated that VSM2$_i^2$ (Association Significance Number ASN) is a good compromise in terms of the quality and calculation complexity.

Considering that the motivation for calculating the VSMx$^{l|k}$ x, e.g. VSMx$_i^{2|1}$, is to select the most merit-full partitions from the composition for the desired application, e.g. as a distilled representatives of the body of knowledge of the input composition. Hence VSMx are more useful when they are normalized. Therefore slight change in the normalized values of VSMx$_i^{k|\cdot\cdot\text{ or }l|\cdot\cdot}$ can change the outcome of the applications that uses these values quite considerably.

Figure 6B:
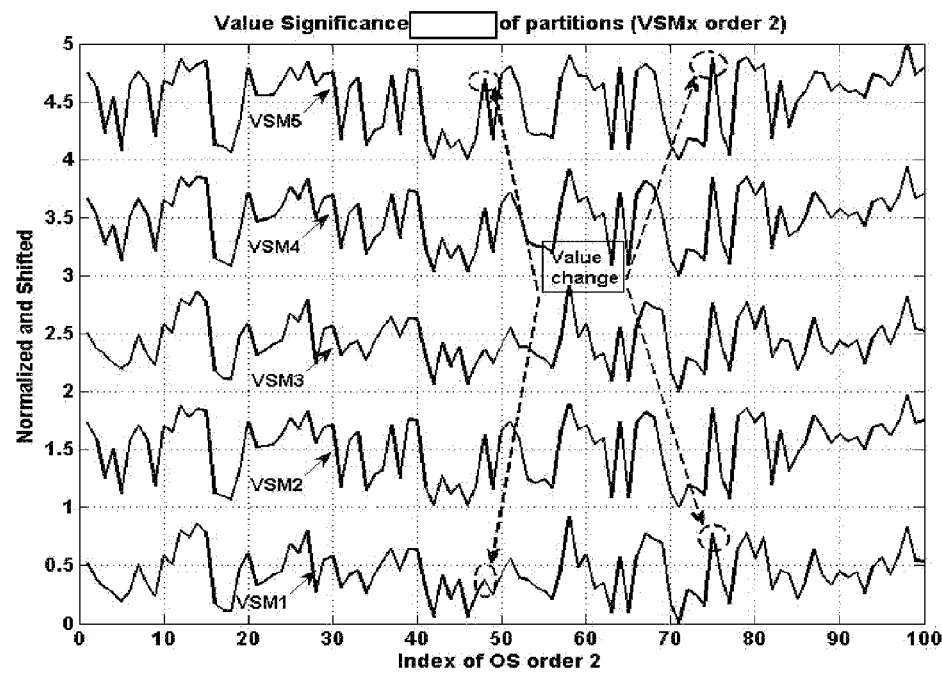

FIG. 6*b*, shows the two instances for which the normalized VSM has been changed for different VSMs. Those OSs whose normalized VSM are changed can carry non-trivial and non-obvious information about the OSs. That information might be used for novelty detection in some applications.

Figure 6C:
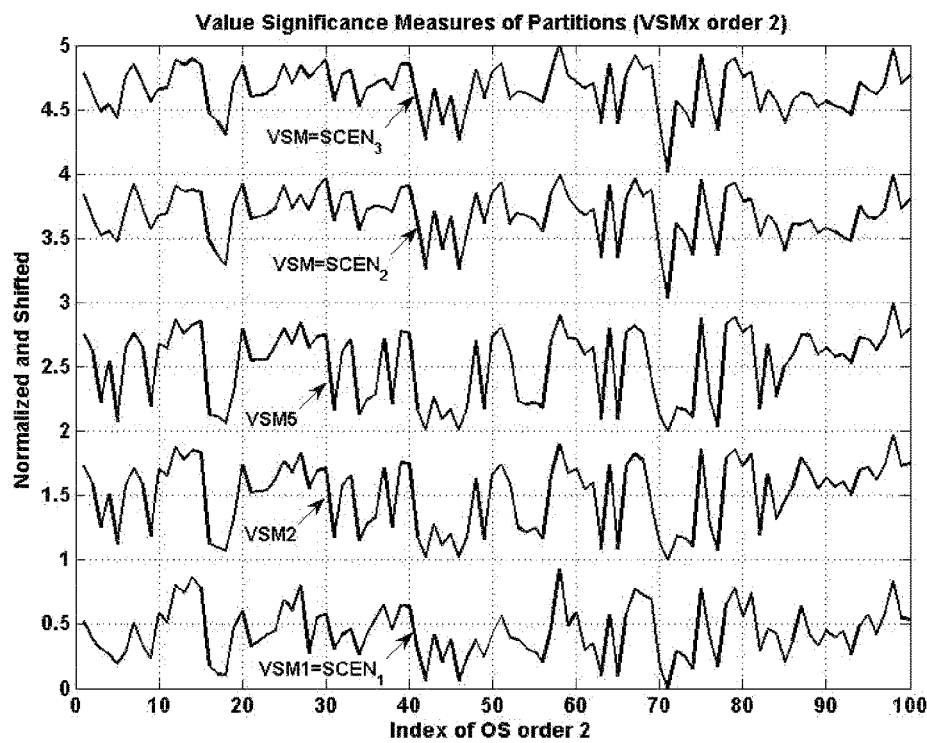

FIG. 6c, compares the higher order value significance using the VSMs of the current application with the method of Semantic Coverage Extent Number (SCEN) evaluation introduced in the patent application Ser. No. 12/755,415. In FIG. 6c, the $SCEN_2$ is calculated using the cosign similarity measure and $SCEN_3$ is using the common OS divided by combined unique OSs of the two higher order OS as a similarity measure of two partition or higher order OSs (see Eq. 5, 6, and 7 from the referenced application Ser. No. 12/755,415).

As seen again they are all highly correlated but a closer look reveals that $VSM2^2$ and $VSM5^2$ are still less noisy and better pronounced than the SCEN method or the $VSM1^2$ that uses Frequency Occurrence (FO). Moreover again from FIG. 6c, one can notice that the normalized value of some OSs of order 2 has changed for the different curves indicating that relative significances would be different based on the VSM used to evaluate their significance in the composition.

Figure 6D:
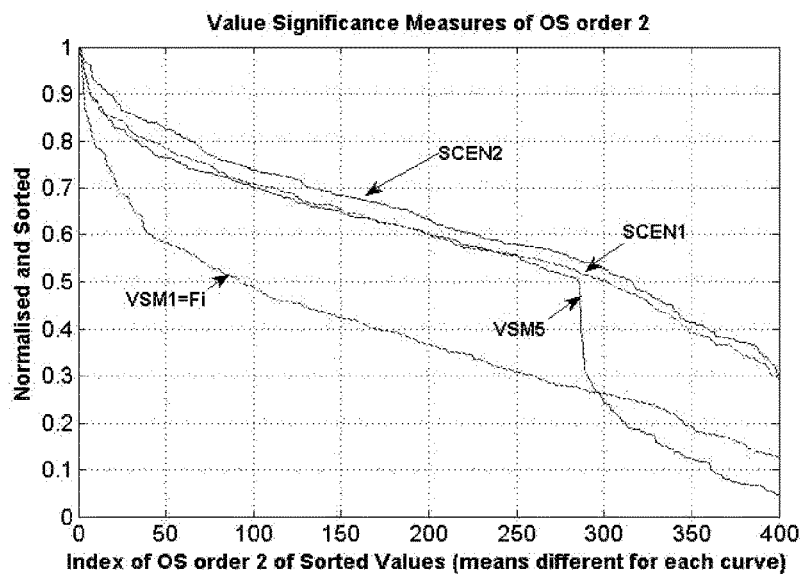

FIG. 6d, shows the sorted VSMx versus their value. It shows the sorted VSMs can be different for different measures and therefore the resultant output of the desired applications using these VSMs can be different.

Also important is that either of $CEM1^{k|l}$ or $CEM2^{k|l}$ can be also used (after multiplying either one by $FO_i^{k|l}$) for measuring and evaluating the real information of the composition in terms of bits which could be considered as yet another measure of value significance for the whole composition or the partitions therein.

It should be emphasized here also that the results depicted in FIG. 6a, b, c, and b, observations, and the interpretations are for a very particular input composition and should not be viewed as general behaviors of the functions and objects that are introduced in this invention. They are only depicted here to show exemplary illustrating ways of investigating the results and the computations of the functions and mathematical objects of the invention.

Again depends on the application and the system capability performing the method and the algorithm one can chose the suitable VSM for that particular application.

In regards to VSM evaluation of higher order OSs in general, yet more conveniently, (also for faster computation), after evaluating the value significance measures of OSs of order l, from the participation information contained in $PM^{k|l}$, one can proceed to evaluate the Value Significance Measures (VSMx) of OSs of other orders, say OSs of the order l+r and |r|≥0, from the VSMx of the OSs of the order l as the following:

$$VSMx(OS^{l+r}|VSMx^{l|k})=VSMx^{l+r|(l|k)}= VSMx^{l|k}.PM^{l,l+r} \quad (16).$$

Figure 7:
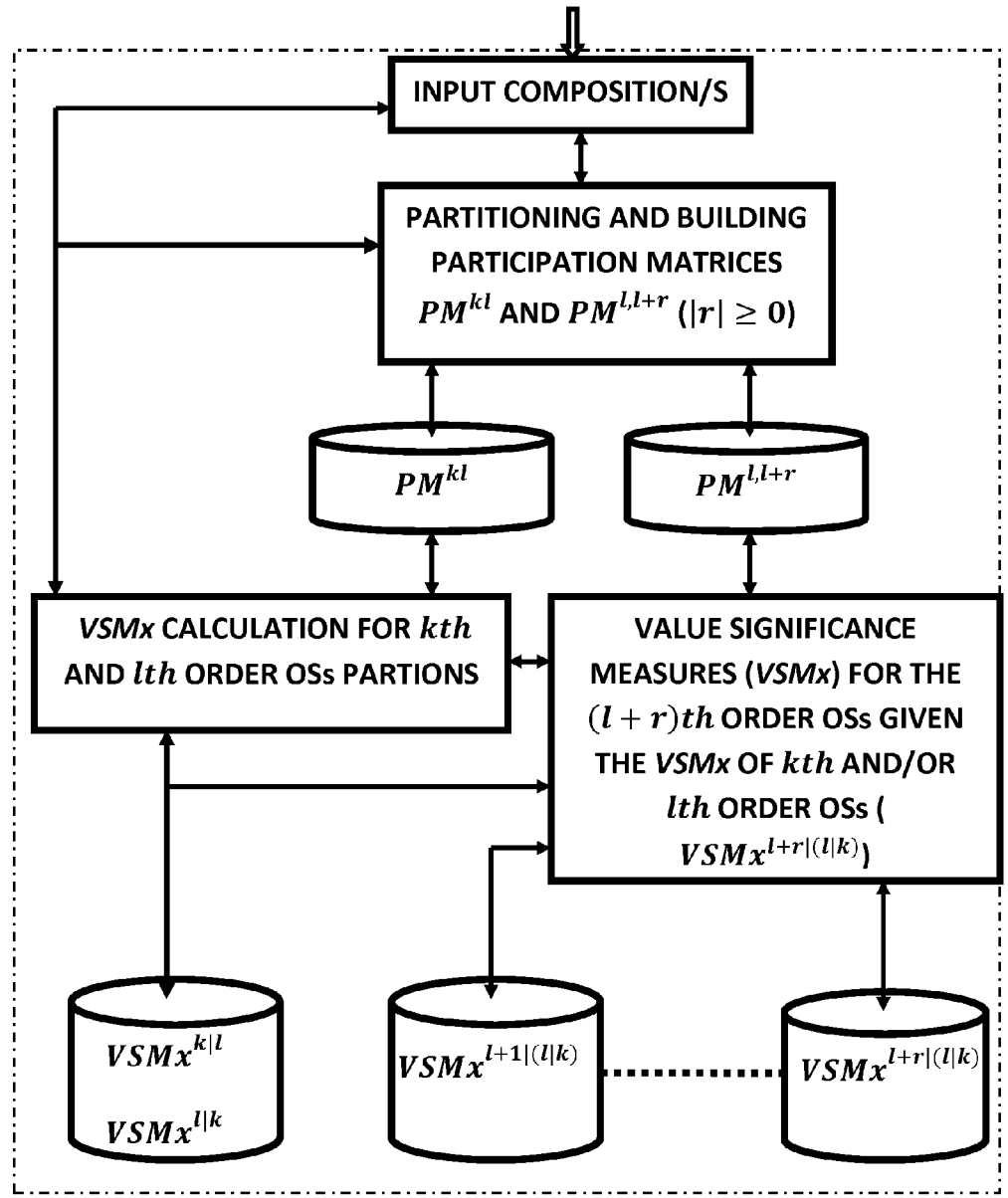
FIG. 7: schematic view of the system and method of building at least two participation matrixes and calculating VSM for lth order partition, $OS^l$, to calculate the Value Significance Measures (VSM) of other partitions of the compositions and storing them for further use by the application servers.

FIG. 7, shows the block diagram of the algorithm and the system of calculating value significances for different orders of OSs using VSMx values of other OSs. In this figure at least two participation matrices are built, say one for participation of kth order into lth order, i.e. $PM^{k|l}$, and another lth order to (l+r)th order, i.e. $PM^{l|(l+r)}$, consequently the VSMx of the lth order OSs is calculated from $PM^{k|l}$ which is denoted by $VSMx^{l|k}$ according to our notations in this invention. Having calculated $VSMx^{l|k}$ and using the participation matrix of $PM^{l|(l+r)}$ one can proceed to calculate the Value Significance Measures of the (l+r)th order from the Eq. 16. Also shown in the FIG. 7 are databases that store and make it ready for information retrieval of VSM values of OSs of different orders when needed by other parts of the application and/or services. This embodiment is particularly useful for classifying and ranking the documents, webpages, and longer partitions.

Figure 8:
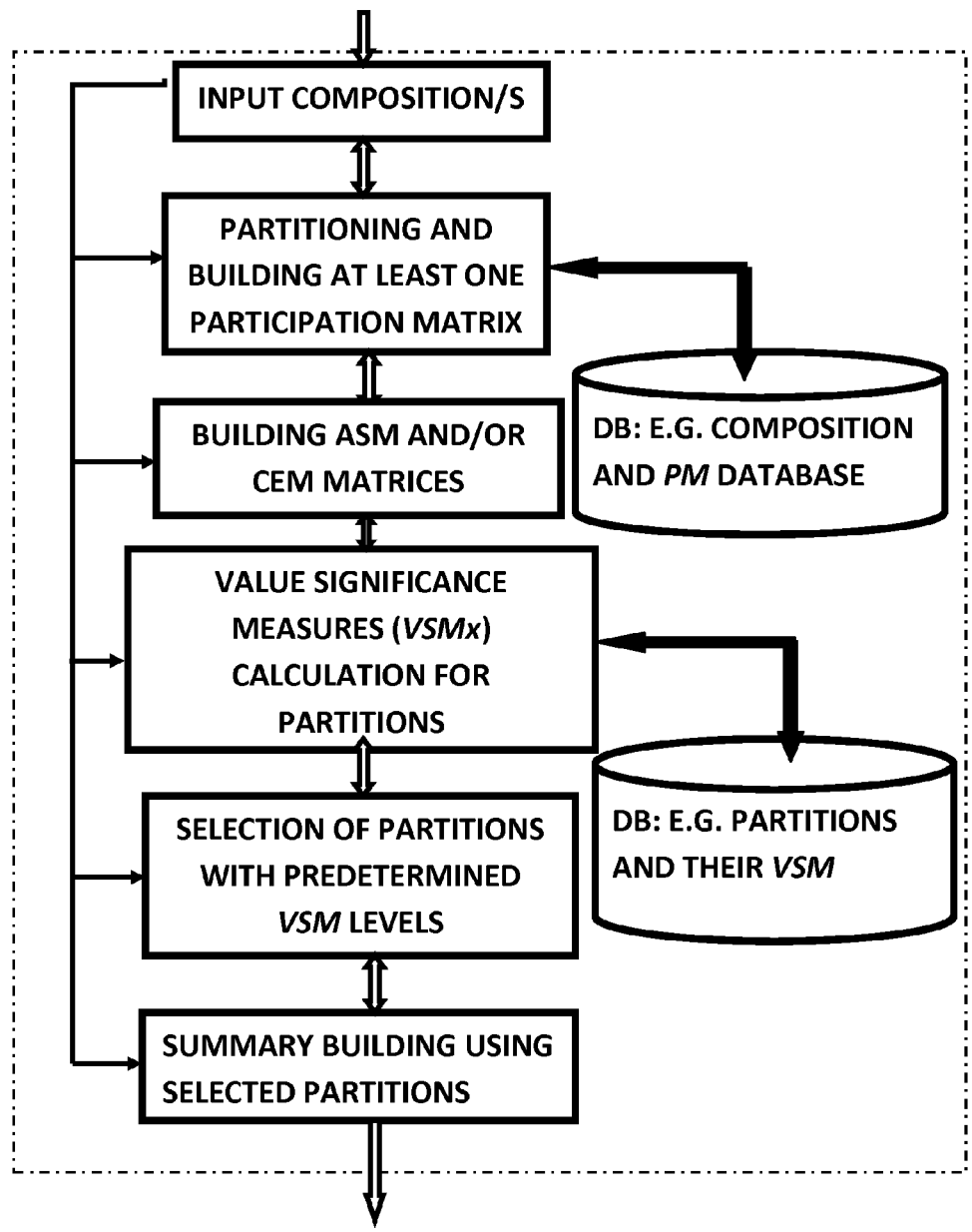
FIG. 8: is a flowchart of estimating Value Significance Measures (VSMs) of the partitions of a composition following by an exemplary summarization application (which is a general application).

Referring to FIG. 8 now, it shows a block diagram of a general system, application, method and algorithm, of estimating the Value Significance Measure (VSM) of partitions of an input composition, with applications in summarization as described hereinabove and herein below.

Further explanation in reference to FIG. 8 is given by description of an exemplary, and also an important, case of summarization of a single text document in more details.

A composition, e.g. a single document, is entered to the system of FIG. 8. The system pars the composition, i.e. the document, into words and sentences, and builds the participation matrix showing the participation of each of desired word into some or all sentences of the composition. Then the system, using the algorithm, calculates the COM and ASM and calculates the VSM/s for each sentence. The summarizer then selects the desired number of the sentences (having the desired range of VSM) to represent to a user as the essence, or summary, of the input document. One might choose the different ranges or parts of the VSM for other intended applications.

Referring to FIG. 8 again, the input composition can be a collection of webpages or collection of documents which form a corpus. In this case the output summary is the summary, or distilled form of the corpus. Therefore with the system and method of FIG. 8, single or multi-document, corpus collections and the like, can be summarized, distilled, clustered, or selected as an answer to a question.

At the same time the method and the system can be employed for clustering partitions of the compositions, e.g. sentence in the above case, by simply grouping those partitions having almost the same VSM in the context of the given input composition.

Again in one particular and important case, consider the input composition to be a large number of documents and the preferred PM matrix is built for $PM^{1,5}$ (participation of words, k=1, to document, l=5), which is used to subsequently calculate $VSMx^{5|1}$. The resulting $VSMx^{5|1}$ can therefore be used to separate the documents having the highest merits (e.g. having top substance, most valuable statements, and/or well rounded) within this large collection of the document. In this exemplary case, the winner has the highest VSM after a fair competition, for scoring higher VSMs, with many other documents contained in the collection. Also shown in the FIG. 8 are the databases storing the compositions, participation matrixes, the partitions of the compositions, and the VSMx of the partitions of the composition to be used by other applications, middleware, and/or application servers.

Figure 9:
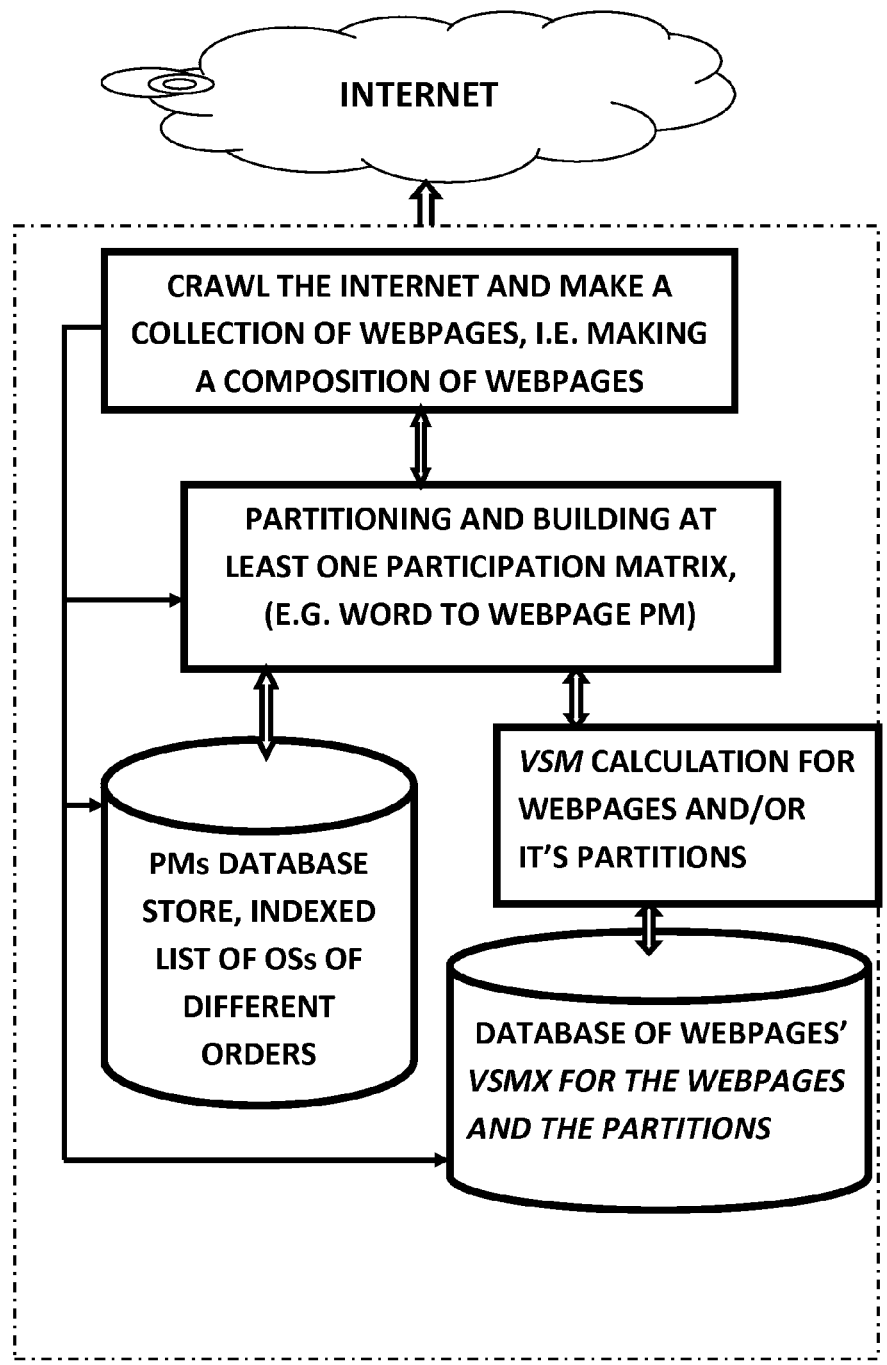
FIG. 9: a block diagram of an exemplary application and the associated system for ranking and storing the crawled webpages from the internet using Value Significance Measures (SVM).

Referring to FIG. 9 now, it is to demonstrate another important exemplary application. FIG. 9 employs the method and the system for ranking and retrieval of document and webpages for using as a search engine. In this embodiment the crawlers will crawl the web and gather as many webpages as it can or need from the internet. The whole collection can be regarded as a composition (can be called e.g. the internet composition) which will be broken to the constituent webpages and the constituent words, or phrases, or sentences etc. of the webpages. Then construct at least one PM for the collection of the webpages and/or its partitions. In the preferred embodiment using this method the lower order OSs are the words and phrases and the higher order OSs are the sentences, paragraphs and the webpage itself. Calculating the VSM for each webpage then can rank all the webpages based on their real intrinsic value and substance.

As seen in FIG. 9, the system crawl the internet and make a collection of webpages, then proceed with partitioning, parsing and building the participation matrix/matrices of constituent lower order OSs participation to higher order OSs of the internet composition.

All the information such as the composition, partitions, and all the other components may be stored in databases for use by the search engine. Particularly the at least one participation matrix is advantageously stored since it contain the most important information.

Figure 10:
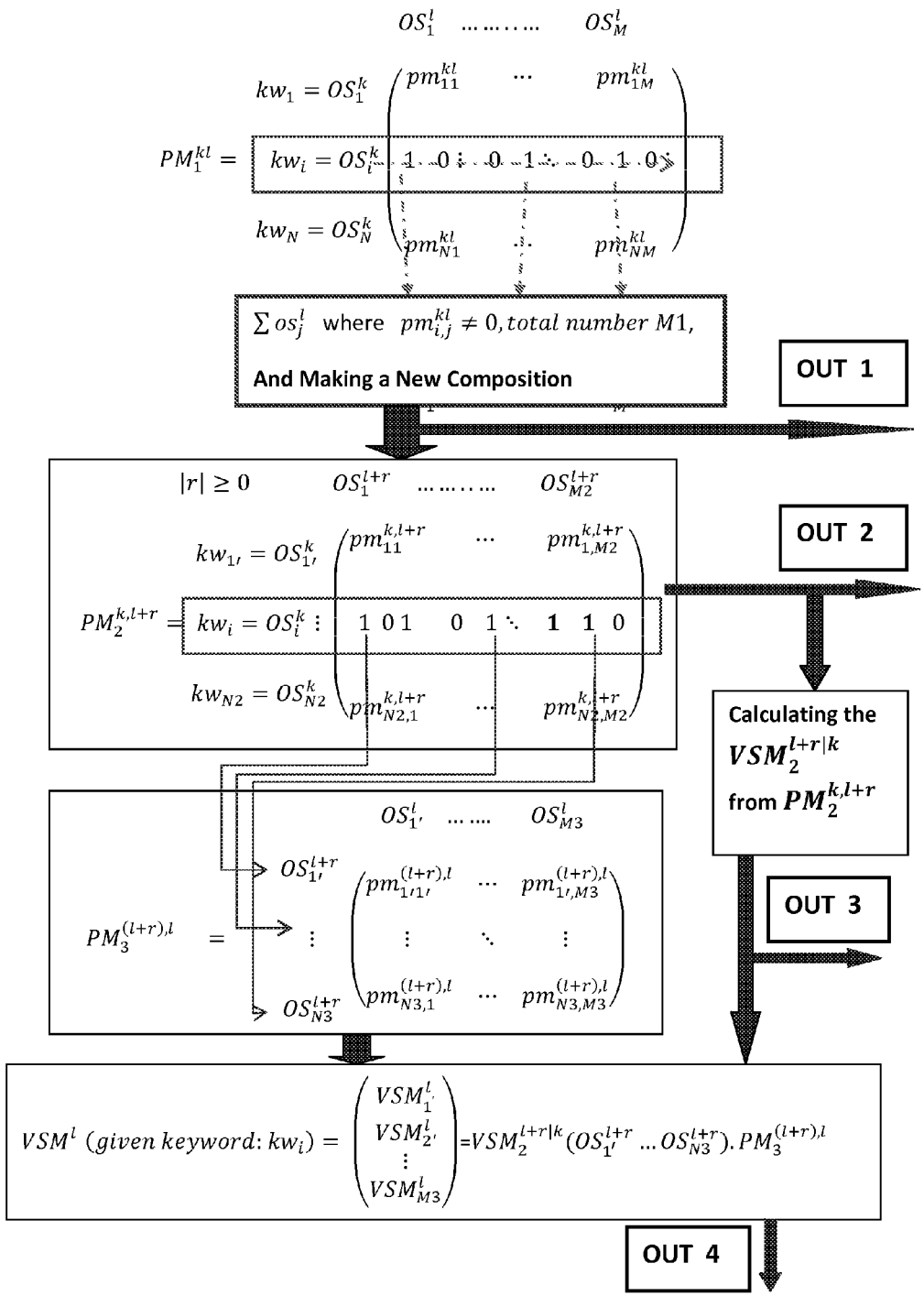
FIG. 10: shows the flow diagram and flow process of a system that produces, employing the PMs and the VSMs algorithms, several outputs related to an input query or keyword.

In FIG. 10 the uses of the stored information of the participation matrices are demonstrated in an exemplary integrated question answering system that serves a user the right information about her/his query in the form of the most appropriate answer/s. The answer could be a webpage, a document, a paragraph, a sentence or a statement, or any partitions of the composition that conveys the most appropriate information related to the query.

Let's explain FIG. 10 in detail by focusing on an exemplary but familiar service of a search engine that return the most appropriate webpages as an answer to user request for information about an exemplary keyword (shown as $kw_i$ in FIG. 10) while at the same time can also provide an answer to the query in other forms such as the best statements, e.g. sentences, the best paragraphs, or the best partitions of the internet composition related to the query. Now suppose this search engine have built a first participation matrix, say $PM_1^{k,l}$, of words (e.g. keywords) into webpages (e.g. lets also say k=1, as the keywords OS order, and l=5 as the webpages OS order). When a user query the system for related information, the search engine can comb out all the webpages that contains the keyword, all M1 number of $OS_i^l$ for which the $pm_{1,ij}^{kl} \neq 0$, and present it back to the user as the answer to the user query, the OUT 1 in FIG. 10. However it might be more desirable to rank this new set of webpages, containing the keywords, more accurately. In this case one can evaluate the VSMx (for instance the VSM1, or VSM2 only for simplicity) for this new set of webpages (i.e. all M1 number of $OS_i^l$ for which the $pm_{1,ij}^{kl} \neq 0$) by making a new composition from this set and building the desired PM/s. However it might be more desirable to rank this new set of webpages, containing the keywords, even more accurately.

For more accuracy and relevancy the system can build at least one the second participation matrix, denoted by $PM_2^{k,l+r}$ in FIG. 10, using words and smaller partitions of webpage such as paragraphs or sentences, (denoted by $OS_1^{l+r}$ when r<0), and evaluate the VSMx for the sentences or paragraphs. The search engine system at this stage can return a set of smaller partitions, containing the keyword, as the answer to the user query, OUT 2, or the ranked set, based on the VSM, of smaller partition as the answer, OUT 3. The search engine can also return the ranked most appropriate webpages, or webpage based on the VSMs of their partitions, i.e. $VSM_2^{l+r|k}$ in the FIG. 10, and the information of yet another participation matrix, e.g. $PM_3^{(l+r),l}$ in FIG. 10. As seen in FIG. 10 the third PM, is built from the participation of the combed out partitions, from the $PM_2^{k,l+r}$, containing the keyword, into the webpages $OS_1^l$. Consequently calculating the Value Significance Measure of the webpages, related to the query keyword, the system can return the most appropriate webpages to the users, OUT 4 in the FIG. 10.

The advantage of such exemplary integrated answering system is that for the given query different answers can be provided to the user at the same time. The ranked sentence answers are not necessarily listed in the order of the list of the webpages that contains those sentences. For instance, a sentence level answer to the query, e.g. OUT 2 or OUT 3 in FIG. 10, is independent of the webpage rank. However the rank of the higher order OSs, e.g. the webpages, are more dependent on the value significance ranks of the lower order OSs which results in a ranking method that is based on the intrinsic value of the contents of the webpage. Also each answer is independently qualified in comparison to a large group of possible answer having the same OS order. In this way the answer is more based on the intrinsic value of the answer in relation to the keyword rather than general importance of the webpage as is customary in current commercial search engines.

Alternatively or additionally one can, yet, combs out the smaller partitions of the set of webpages containing the keyword, (e.g. the sentences, or paragraphs, containing the keywords) and calculate their VSM. And from the PM of sentence to webpage then rank the webpages related to the keyword more accurately in terms of real relevancy to the query, and more appropriately.

Figure 11:
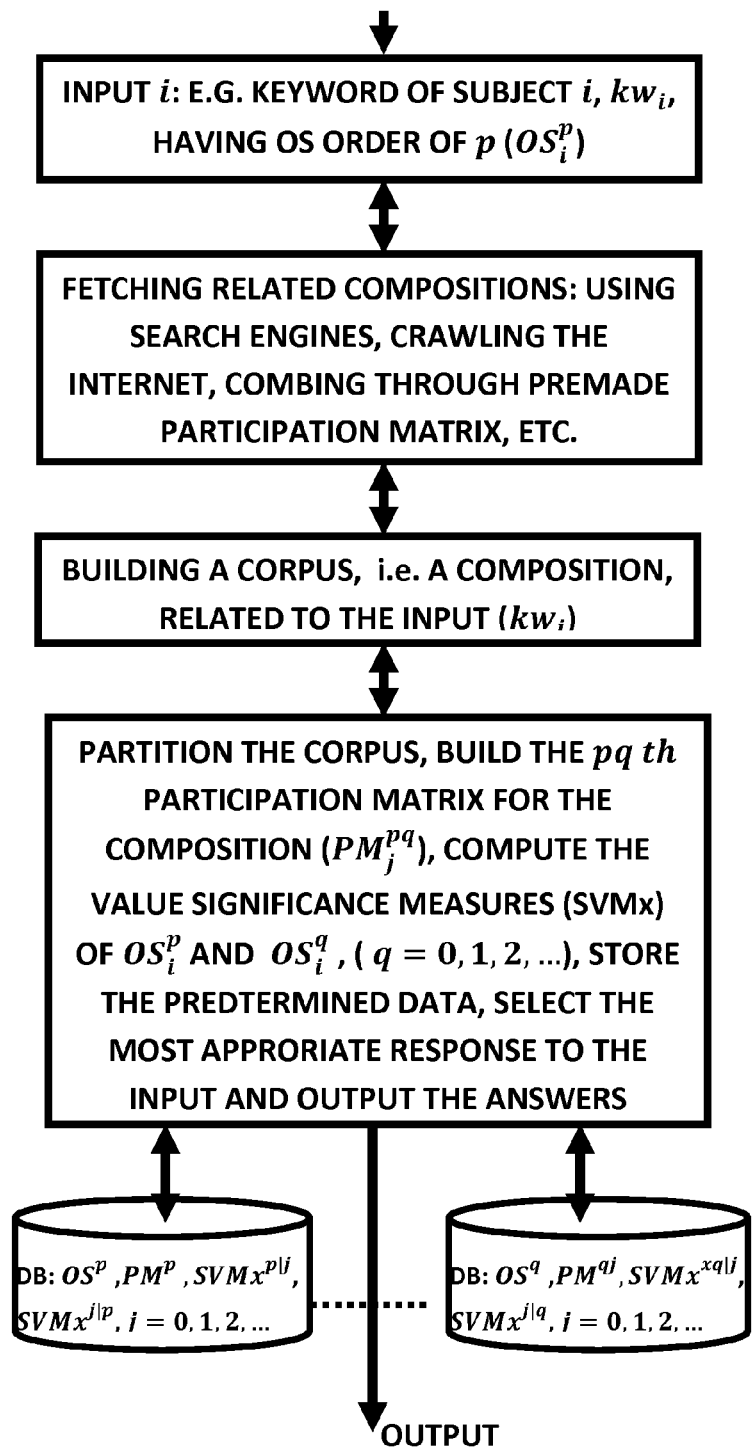
FIG. 11: shows the block diagram of an exemplary query/answer system which computes and store Value Significance Measures of Ontological subjects of different orders along with all other desired data.

Referring to FIG. 11 now, the figure shows an exemplary block diagram of a system of question answering having the executable computer code for implementation of the algorithm of FIG. 10 to providing one set of answer to a given query. One or several computer and computer servers maybe employed to execute and implement the algorithm of FIG. 10. The output in FIG. 11 is at least one of the outputs of FIG. 10. A keyword is entered to the system and the system fetch the related compositions of different levels for the input keyword having an OS order of p ($OS_i^p$), make a composition for that keyword, or the key OS, using the composition the system proceed with proceed with calculating all the desired parameters such as VSMx of the partitions or OSs of different orders, and depend upon the predesigned service, provide the appropriate outputs as the response to the query or keyword. Meanwhile the system can store the information in the databases as shown in FIG. 11 to be used for later use. The system can be devised to automatically perform the same for whole lists of keywords, or key OSs offline to make premade databases to be used later by other application programs and/or services.

Figure 12:
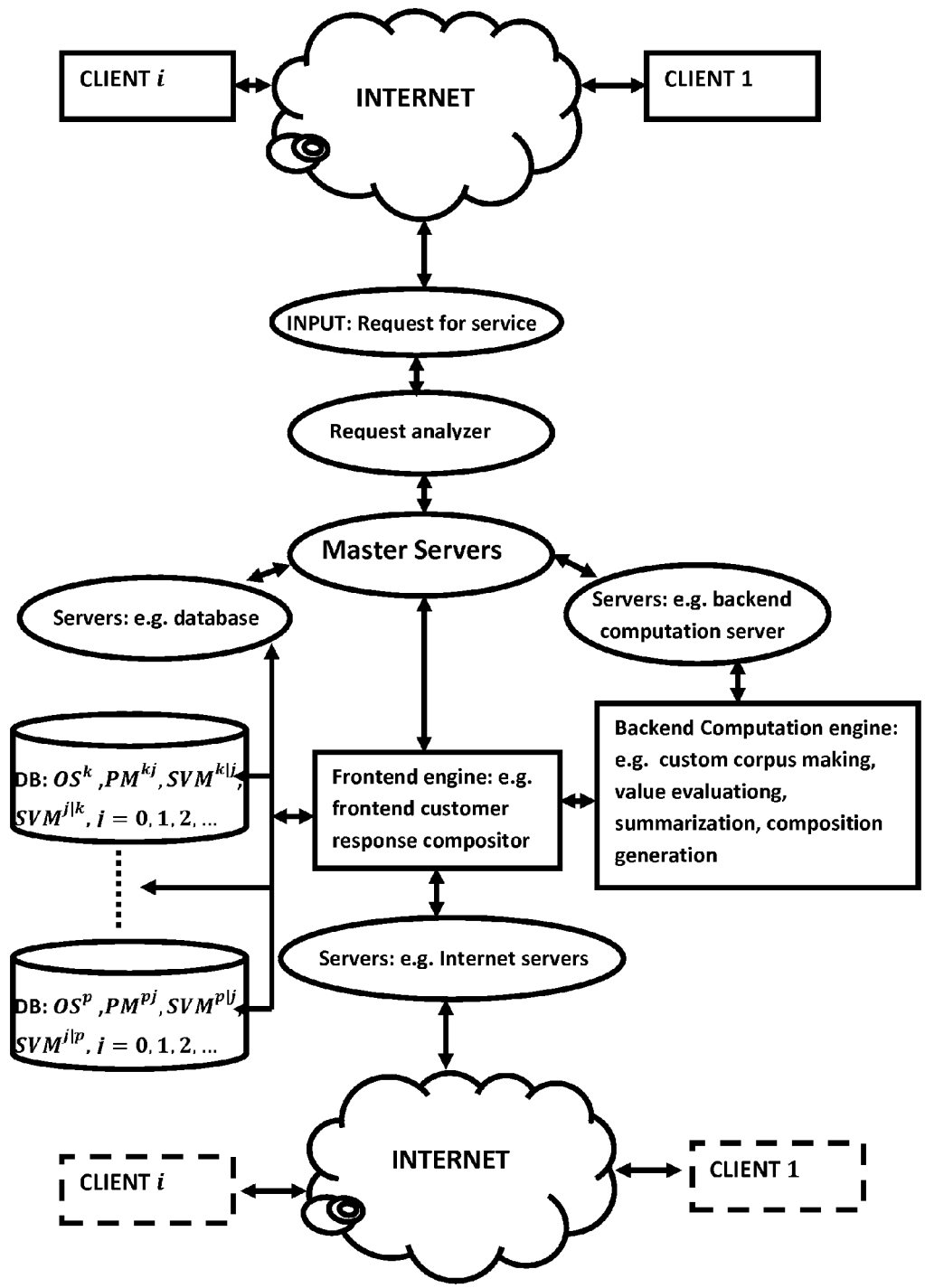
FIG. 12: shows an exemplary client-server type system to fulfill requests of users for services such as composition analysis, summarization, document ranking and comparison, web searching engine, search priority and research trajectory guidance, graphical navigation of knowledge, distilled knowledge answering, knowledge maps and OSM, new document composition, question answering etc.

Referring to FIG. 12 shows an exemplary system of client and server application through internet or any other communication or data networks. As shown the system receives a request for service in predetermined forms or formats such as a keyword, a natural language question, request for summarization, request for list of ranked documents or webpages, or all other types of applications that some were listed before. The system consists of hardware and software programs needed to implement and execute the method and algorithms and to process the requests of clients, such as computer servers and software packages for serving the clients in the frontend or working for the client's request at the backend engine and fulfill the client request. There is a request analyzer which analyze the request and decide where and which one of the server/s is best suited to fulfill the request. The system also can have access to premade databases such as the databases shown in FIG. 11. After processing the client's request the system compose the response/s for the client's request and send it back to the client through internet or any other means of communication or any device and apparatuses suitable to serve the client's request.

Exemplary Applications:

Few exemplary applications of the methods and the systems disclosed here are listed below, which are intended for further emphasize and illustration only and not meant neither as an exhaustive list of applications nor as being restricted to these applications only.

1. Clustering of compositions or their partitions: one of the applications is clustering of compositions versus their constituent ontological subjects having a predetermined level of VSMs values.
2. Composition ranking: another obvious application is ranking of compositions among a collection of compositions to be used in search engines, information and document retrieval, optimum database storing etc. Simply put a composition having the highest evaluated VSMs rank higher among a set of compositions.
3. Summarizations: selecting a number of OSs of a desired order, having a desired range of one or more of the VSMs, from the set of partitions of a composition, a corpus, or a collection, as the summary representation of the composition, corpus, or the collection.
4. Distillations: finding the essence of corpus or a collection of compositions by one or more stages of summarization.
5. Novelty detection: using the association strength and one or more of the VSMs one can spot a novelty depend on the levels of the ranking parameters corresponding to the partitions of the composition. For instance spotting a novelty based one observing a strong association of an OS with low VSM with an OS of high VSM.
6. Main bulk detection of corpuses or compositions: selecting a number of OSs, i.e. the partitions of the composition, having predetermined value significance, e.g. having values around the predetermined range of one or more of the VSMs, for representing the bulk or main body of a corpus or a clustered group of composition related to topic etc.
7. Background information of corpus: selecting a number of OSs, i.e. the partitions of the composition, having predetermined value significance, e.g. having the high VSMs, for representing the verified facts and basic background of a corpus or a clustered group of composition related to a topic etc.
8. Automatic Document Generation: selecting a number of OSs having a predetermined spectrum, e.g. highest, average, lowest of VSMs, i.e. having semantic importance in the composition, or having certain quantity of association strength with one or more particular OSs, for representation and to compose a new document representing the whole corpus covering the desired aspects, (e.g. novel, bulk, background or any combination) of a corpus or a clustered group of composition related to a topic etc.
9. Verified true statements: assuming one have a corpus or a collection of document as the initial composition which is broken to partitions such as words and sentences or statements, then clustering the partitions based on containing one or more keywords, then those partitions or statements that have the highest VSMs can be considered as the true statements expressing facts or true statements related to those keywords contained in the partitions. The true statements corresponding to the keywords may further be stored in databases as premade repositories for using, for instance, by a client server system of services.
10. Question answering: having stored the true statements about one or more keywords, then a question answering engine system can use these statements as the answers to the questions containing the keywords used in the corresponding true statements that have been stored in the databases.
11. Document comparison: using the ranking method disclosed in here one can cluster the documents and further ranks the partitions therein and identifies the partitions as novel, true background, and descriptive, one then can characterize the documents in comparisons to large collection of documents or to each other as being, for instance, novel or descriptive among a set of the same etc.
12. Ontology database building: in a similar fashion to finding the verified true statements related to keywords one can build databases as repositories of knowledge about entities or subject matters as well as their relations.
13. DNA sequence interpretation: considering a DNA sequence as a composition, and breaking this composition to OSs of desired orders in order to look for patterns and locations of DNA pieces having predetermined ranges of VSMs, i.e. semantic importance range. The method and the associated system in the form of computer hardware and programs can be used for gene detection, genome summarization, gene ranking, junk DNA detection, genetic modification and engineering, etc.
14. Signal processing: using any form of symbols for representation of physical signals one can make a composition and rank the OSs of the composition for using in different applications and processing of the signal. The method can be used for processing audio and video signals for feature extraction, recognition, pattern recognition, summarizations, compression, conversion from one form to another form of signal etc.
15. New essay or composition generation: new compositions or well written essay can be generated using the generated databases for the listed applications and using the association of the OSs.
16. Mapping OSs of different nature to each other: databases of OSs of different nature, e.g. text and video signal, having similar semantic and syntactic functions can be stored and converted to each other. For example one can build equivalent compositions from text and video signals which can convey the same semantic message.
17. Market research and market analysis: a market research analyst can gather all or some of the contents that are available about an industry, a particular enterprise, a particular product etc. and investigate the real value of all the entities that are related to the industry of the enterprise or the product and from the VSMs evaluation of the OSs of those content have a good evaluation of intrinsic value of the OSs (e.g. the entity or any attribute etc.) of interest. So he can make a corpus containing a desired number of contents containing the OS or OSs of the interest by using for instance a search engine.
18. Social networks and social graph analysis of importance and influence: another example is a social network or social graph in which the OSs of interests are people. So the textual OSs of interests are in fact individual names for which a graph and an association matrix can be obtained from the participation matrices. For instance the Facebook or LinkedIn social graphs or any other social graph or network show the connection of people to each other from which one can build an adjacency matrix for the graph or make an association matrix from their popularity. However the association matrix built from that adjacency matrix is not accurate since those social graphs only show the connections between two people but do not have a way to measure their real association strength with each other. An association strength evaluation or other value significance estimations that disclosed in this invention can be used to more effectively and accurately evaluate the value, or influence significance, of each person in the graph, or finding the connections that have high association strength with each individual in the social graph.

A more accurate approach that can show a better indication of the association between two members would be using the actual text or messages that have been exchanged between the two. The value of each person on the graph then is evaluated from the association strength matrix by building the participation matrices and that are extracted from the correspondences of the members of the social network.

19. Identifying research priorities: As described any composition of ontological subjects in the forms of symbols and signal can be transformed to a set of ontological subjects having the common feature of taking part in a composition or a set of compositions. The compositions were further reduced to one or more participation matrices from which useful information about the individual OSs as well the partitions of the compositions can be obtained. After determining the most valuable (e.g. influential OS of the network) the links that connects the high value OSs become important for further investigations and analysis or guidance to knowledge discovery.

20. Personalized advertisement: Another application is personalized advertisement for delivering the right message to the right person. For instance an advertising system can be devised to deliver dynamic content to the user according to their associations bonds and significances.

21. Legal and fraud investigation: legal issues such as criminal investigations, abnormal behavior detection, fraud detections etc. can be done more effectively by having evaluated the relationships and association strength of the subjects and their value significances from the collected data and information corresponding to the subject under investigation.

22. Obtaining the context: having evaluated the value significances of the OSs, e.g. entities and concepts, of a composition and then having evaluated the association strengths of the OSs to each other, one can quickly obtain the real context of the composition and find the role of each OS, e.g. each entity, in this context by looking at the highest value OSs and their strongest associations.

In summary, the invention provides a unified and integrated method and systems for evaluating the value significances, e.g. semantic importance, of compositions and their partitions among a set of compositions. More importantly the method is language independent and grammar free. The method is not based on the semantic and syntactic roles of symbols, words, or in general the syntactic role of the ontological subjects of the composition. This will make the method very process efficient, language independent, without a need to use syntactic or semantic rules of a particular language, applicable to all types of compositions and languages, and very effective in finding valuable pieces of knowledge embodied in the compositions of all types and natures.

The system and method have numerous applications in knowledge discovery and finding the best piece of knowledge, related to a request for knowledge, from one or more compositions. The invention can serve knowledge seekers, knowledge creators, inventors, discoverer, as well as general public to obtain high quality contents related to their subjects of interests. The method and system, thereby, is instrumental in increasing the speed and efficiency of knowledge retrieval, discovery, creation, learning, and problem solving to name a few.

Those familiar with the art can yet envision, alter, and use the methods and systems of this invention in various situations and for many other applications. It is understood that the preferred or exemplary embodiments, the applications, and examples described herein are given to illustrate the principles of the invention and should not be construed as limiting its scope. Various modifications to the specific embodiments could be introduced by those skilled in the art without departing from the scope and spirit of the invention as set forth in the following claims.

What is claimed is:

1. A method of determining associations strength between ontological subjects participated in a composition comprising:

decomposing, using one or more data processing or computing devices, said one or more data processing or computing devices having a singular or compound processing speed of one thousand million or larger than one thousand million instructions per second, the composition into its constituent ontological subjects, said ontological subjects are grouped into at least two groups, each group having a predefined ontological subject order, evaluating, using one or more data processing or computing devices, said one or more data processing or computing devices having a singular or compound processing speed of one thousand million or larger than one thousand million instructions per second, and building one or more data structures corresponding to co-occurrences of at least one pair of ontological subjects of a first order from the data of their participation into the plurality of ontological subjects of a second order, evaluating independent number of occurrences of at least two of ontological subjects of the first order wherein the at least two ontological subjects are members of the at least one pair, calculating value of a predefined association strength function, said association strength function is a function of the number of co-occurrences of said pair of ontological subjects and the independent number of occurrences of at least one of the ontological subjects of the pair wherein said calculated value is an indicative of association strength of the pair of ontological subjects processing or building one or more data structures, corresponding to one or more of values of said value of association strength, wherein said one or more data structures is stored in one or more non-transitory computer readable storage medium and making a visually displayable graph or network of graphical objects wherein the graphical objects representing the ontological subjects wherein each graphical object is connected to one or more of other graphical objects having association strength of predetermined range of values with that graphical object.

2. The computer implemented method of claim 1, wherein the composition is a textual composition.

3. The computer implemented method of claim 1, wherein the composition is a genetic code composition.

4. The computer implemented method of claim 1, wherein the composition is a genetic code, said genetic code have symbols representing at least one of chemical bases of adenine, thymine, guanine, cytosine, and uracil.

5. The computer implemented method of claim 1, wherein the composition is represented by a digital signal string having ones and zeros.

6. The computer implemented method of claim 1 further configured to graphically indicates visual quantities proportional to the value of association strength of the ontological subjects in the network.

7. The method of claim 1, further comprising storing one or more of the followings in a computer-readable storage medium:
   a. at least one of said partitions,
   b. at least one of said ontological subjects,
   c. at least one array of data related to at least one participation pattern representing participation of at least some of said ontological subjects into some of said partitions,
   d. at least one array of data corresponding to at least one ontological subject of the composition, wherein said array of data contain information related to association strength of said at least one ontological subject with at least one of other ontological subjects of the composition,
   e. at least one of said partitions selected from the partitions based on values of association strength of some of the ontological subjects of the composition with each other.

8. The computer implemented method of claim 1 wherein the association strengths calculated for an ontological subject with a plurality of other ontological subjects of the composition and is further multiplied by a function of the probability of occurrence or frequency of occurrence of one of the ontological subjects of the composition.

* * * * *